(12) United States Patent  
Murdoch et al.

(10) Patent No.: US 11,587,084 B2  
(45) Date of Patent: Feb. 21, 2023

(54) DECENTRALIZED IDENTIFICATION ANCHORED BY DECENTRALIZED IDENTIFIERS

(71) Applicant: Microsoft Technology Licensing, LLC, Redmond, WA (US)

(72) Inventors: Brandon Murdoch, Reading (GB); Ankur Patel, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 331 days.

(21) Appl. No.: 16/804,448

(22) Filed: Feb. 28, 2020

(65) Prior Publication Data

US 2021/0272120 A1    Sep. 2, 2021

(51) Int. Cl.
*G06Q 20/00* (2012.01)
*G06Q 20/40* (2012.01)
(Continued)

(52) U.S. Cl.
CPC ......... *G06Q 20/4014* (2013.01); *G06F 16/27* (2019.01); *G06Q 20/065* (2013.01);
(Continued)

(58) Field of Classification Search
CPC ............. G06Q 20/4014; G06Q 20/065; G06Q 20/3674; G06Q 20/3678; G06Q 20/3825; G06Q 20/3829; G06Q 2220/00; G06Q 20/363; G06Q 20/38215; G06Q 20/3823; G06Q 20/383; G06Q 20/385; G06Q 20/40145; G06F 16/27; G06F 21/41; G06F 2221/2103; H04L 9/3247; H04L 2209/56; H04L 9/50; H04L 63/0815; H04L 63/126; H04L 9/3239
(Continued)

(56) References Cited

U.S. PATENT DOCUMENTS 10,735,574 B1 * 8/2020 McDonald .......... H04M 1/2757
2018/0374131 A1 * 12/2018 Currie ................ G06Q 30/0617
(Continued)

FOREIGN PATENT DOCUMENTS

WO    2019179534 A2    9/2019

OTHER PUBLICATIONS

"International Search Report and Written Opinion Issued in PCT Application No. PCT/US21/014255", dated Apr. 8, 2021, 12 Pages.

*Primary Examiner* — Dante Ravetti
(74) *Attorney, Agent, or Firm* — Workman Nydegger

(57) ABSTRACT

Generating self-issued claims anchored by DIDs and using the self-issued claims as self-identification. The computing system generates one or more claims, each of which includes at least information related to (1) a DID, (2) a property of a subject entity who is an owner of the DID, and (3) a value corresponding to the property. For each of the one or more claims, the computing system generates a cryptographic signature by signing the claim with a private key associated with the corresponding DID. The cryptographic signature proves that the claim is a self-issued claim, which is issued by the owner of the corresponding DID and is about the owner of the corresponding DID. A portion of data related to the self-issued claim is then propagated onto a distributed ledger.

14 Claims, 13 Drawing Sheets

Computing System
*100*

(51) Int. Cl.
*G06F 16/27* (2019.01)
*G06Q 20/06* (2012.01)
*G06Q 20/36* (2012.01)
*G06Q 20/38* (2012.01)
*H04L 9/32* (2006.01)

(52) U.S. Cl.
CPC ..... *G06Q 20/3674* (2013.01); *G06Q 20/3678* (2013.01); *G06Q 20/3825* (2013.01); *G06Q 20/3829* (2013.01); *H04L 9/3247* (2013.01); *G06Q 2220/00* (2013.01); *H04L 2209/56* (2013.01)

(58) Field of Classification Search
USPC .......................... 705/16, 21, 59; 380/44, 262
See application file for complete search history.

(56) References Cited

U.S. PATENT DOCUMENTS

| | | |
|---|---|---|
| 2019/0207995 A1 | 7/2019 | Gonzales, Jr. |
| 2019/0230092 A1 | 7/2019 | Patel et al. |
| 2020/0274713 A1* | 8/2020 | Li ........................ H04L 9/3239 |

* cited by examiner

700A

Select DID(s)  710A
- ☐ DID A
- ☐ DID B
- ☐ ...

Select A Property  720A
- ☐ Property D
- ☐ Property E
- ☐ ...
- ☐ Manual Input

Input A Value  730A
- ☐ Value G
- ☐ Value H
- ☐ ...
- ☐ Manual Input

Generate A Self-Issued Claim 740A

Map Relying Entity(ies) to Claim(s):

Select Relying Entity(ies)  710B
- ☐ DID J
- ☐ DID K
- ☐ ...
- ☐ Manual Input

Select Self-Issued Claim(s)  720B
- ☐ Claim D
- ☐ Claim E
- ☐ ...
- ☐ Generate a new self-issued claim Confirm 730B

*FIG. 7B*

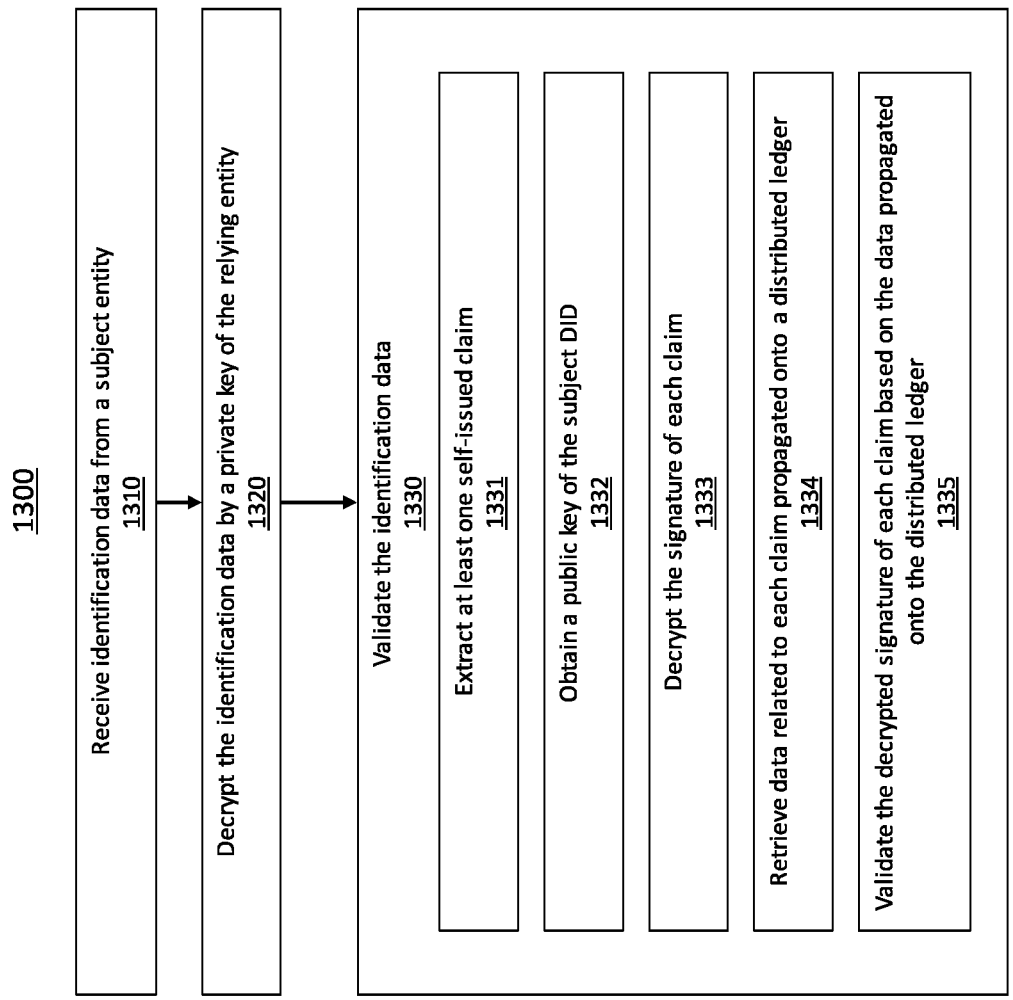

DECENTRALIZED IDENTIFICATION ANCHORED BY DECENTRALIZED IDENTIFIERS

BACKGROUND

Most of the currently used documents or records that prove identity are issued by centralized organizations, such as governments, schools, employers, or other service centers or regulatory organizations. These organizations often maintain every member's identity in a centralized identity management system. A centralized identity management system is a centralized information system used for organizations to manage the issued identities, their authentication, authorization, roles, and privileges. Centralized identity management systems have been deemed as secure since they often use professionally maintained hardware and software. Typically, the identity issuing organization sets the terms and requirements for registering people with the organization. Further, when a party needs to verify another party's identity, the verifying party often needs to go through the centralized identity management system to obtain information verifying and/or authenticating the other party's identity.

Decentralized Identifiers (DIDs) are a new type of identifier, which are independent of any centralized registry, identity provider, or certificate authority. Distributed ledger technology (such as blockchain) provides the opportunity for using fully decentralized identifiers. Distributed ledger technology uses globally distributed ledgers to record transactions between two or more parties in a verifiable way. Once a transaction is recorded, the data in the section of the distributed ledger cannot be altered retroactively without the alteration of all subsequent sections of the distributed ledger, which provides a fairly secure platform. In such a decentralized environment, each owner of DID generally has control over his/her own data using his/her DID. The DID owner access the data stored in the personal storage that is associated with the DID via a DID management module, which is a mobile app (e.g., a wallet app), a personal computer, a browser, etc.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In centralized environments, users' personal information (e.g., name, phone number, email address) is often recorded in a database of the centralized systems. When two parties perform a transaction, they often can identify each other based on the information registered with the centralized system. For example, a social media account would automatically show a user's name or a profile picture, when the user tries to connect with another user.

Unlike centralized environments, decentralized environments are maintained on distributed ledgers. In such a decentralized environment, users can use decentralized identifiers (DIDs) to perform various transactions. However, a DID is normally a sequence of unintelligible numbers and/or letters that do not include personally identifiable information. For example, on the bitcoin platform, users use wallets to generate keys, and the keys are used to perform transactions. The transactions are then recorded onto a distributed ledger. Since the keys do not include personally identifiable information, it is very difficult to link any particular transaction to a particular person. As such, any two parties of a bitcoin transaction often do not know and cannot find out who the other party is. However, many users of decentralized platforms would like to know who they are dealing with, and these users also would not mind mutually providing some of their own personal information to the other party, as long as such information is kept private within the relevant parties.

The embodiments described herein are related to decentralized identification anchored by decentralized identifiers (DIDs), which allows users to securely identify themselves with a relying entity and allows the relying entity to validate the identification via a cryptographic signature and data propagated onto a distributed ledger. Some embodiments described herein are likely implemented at computing systems that are associated with subject entities who are owners of DIDs, such as a management module (e.g., wallet), a user agent, and/or an ID hub of a subject entity. Some embodiments described herein are implemented at computing systems that are associated with a relying entity. When the relying entity is also an owner of DID, the computing system is likely a management module (e.g., wallet), a user agent, and/or an ID hub of the relying entity. Hereinafter, a computing system associated with a subject entity (including a management module, a wallet, a user agent, and/or an ID hub) is also called a computing system of a subject entity; and a computing system associated with a relying entity (including a management module, a wallet, a user agent, and/or an ID hub) is also called a computing system of a relying entity. In many cases, when two entities are communicating with each other, mutual identification is performed. In such a case, each of these entities is both a relying entity and a subject entity.

In particular, a computing system of a subject entity is configured to generate one or more claims, each of which includes at least information related to (1) a DID, (2) a property of a subject entity that is an owner of the DID, and (3) a value corresponding to the property. The claim is then signed with a private key associated with the corresponding DID to generate a cryptographic signature. The cryptographic signature proves that the claim is issued by the owner of the corresponding DID. Since the claim is issued by the subject entity and is about the subject entity, the claim is called a self-issued claim. A portion of data related to the self-issued claim is then propagated onto a distributed ledger.

In some cases, the computing system of the subject entity generates the one or more self-issued claims based on user indications. For example, the computing system receives a user indication from an owner of a DID for generating a self-issued claim. The user indication includes specifying at least (1) a decentralized identifier, (2) a property of the owner of the DID, and (3) a value of the property. The computing system generates the self-issued claim based on the user indication.

In some embodiments, the computing system also records additional relevant data with at least one self-issued claim as metadata. The additional relevant data includes, but is not limited to, (1) a unique identifier identifying the corresponding self-issued claim, (2) one or more conditions for accessing the self-issued claim, or (3) one or more revocation mechanisms for revoking the corresponding self-issued claim. The one or more conditions for accessing the self-issued claim include, but are not limited to, (1) requiring the relying entity to pay a predetermined amount of cryptocurrency, (2) requiring the relying entity to provide identification information, (3) requiring the relying entity to provide one or more verifiable claim(s), (4) requiring the relying entity to grant permission for accessing a portion of data, and/or (5) requiring the relying entity to provide a particular service.

The one or more revocation mechanisms include, but are not limited to, (1) an expiration time of the corresponding self-issued claim, (2) a predetermined number of times that the corresponding self-issued claim can be accessed, (3) an automatic revocation mechanism that automatically revokes a claim in response to a change of data contained in a DID document of the corresponding DID or personal data of the subject entity, and/or (4) a manual revocation mechanism that allows the subject entity to manually revoke the self-issued claim.

In some cases, the computing system receives a request from a relying entity for self-identification of the owner of the DID. In response to the request, the computing system selects at least one self-issued claims of the subject entity and generates identification data including the at least one self-issued claim. The generated identification data is then sent to the relying entity. Receiving the identification data, the relying entity is caused to validate the identification data via data related to the at least one self-issued claim that is propagated onto the distributed ledger.

In some embodiments, the computing system generates a self-issued claim based on a relying entity's request. For example, the request from the relying entity includes a request for the value of a particular property of an owner of a DID. In response to the request, the computing system accesses personal data of the subject entity or a DID document of the DID to retrieve the value of the particular property of the subject entity. The computing system then generates a self-issued claim including the retrieved value of the particular property and generates identification data including the self-issued claim.

In some embodiments, the computing system also receives a public key of the relying entity, and further encrypts the identification data by the public key of the relying entity. The encrypted identification data is then sent to the relying entity, such that data contained in the self-issued claims of the subject entity is further protected and only accessible by the relying entity.

In some embodiments, the computing system maps multiple self-issued claims to multiple relying entities. The mapping between the multiple self-issued claims and the multiple relying entities are recorded as mapping data. In response to receiving a request from a particular relying entity for self-identification, the computing system accesses the mapping data to retrieve one or more self-issued claims that are mapped to the particular relying entity, and generates identification data including the one or more self-issued claims. In some cases, the mapping data is entered and/or updated manually by user inputs. For example, the computing system receives a user input from the subject entity to generate or update the mapping data. The user input indicates mapping one or more particular self-issued claims to one or more particular relying entities. The computing system then updates the mapping data based on the user input.

In some cases, in response to receiving a request from a relying entity for self-identification, the computing system further determines whether metadata associated with the at least one claim includes one or more conditions and whether the one or more conditions are satisfied. In response to a determination that the one or more conditions are satisfied, the computing system generates the identification data. On the other hand, in response to a determination that the one or more conditions are not satisfied, the computing system denies the request from the relying entity and generates a notification notifying the subject entity.

In some embodiments, in response to a change of value of a property that is associated with a self-issue claim, the computing system revokes a self-issued claim that includes the value of the property or updates the self-issued claim with the changed value of the property.

As briefly mentioned above, on the other side, some of the embodiments described herein are implemented at computing systems of relying entities. A computing system of a relying entity is configured to send a request to a device of a subject entity who is an owner of a DID for self-identification. The computing system of the relying entity then receives identification data from the subject entity. The identification data includes at least one self-issued claim that includes a cryptographic signature proving that the subject entity is the issuer of the self-issued claim. The computing system of the relying entity extracts the at least one self-issued claim from the identification data and decrypts the cryptographic signature with a public key associated with the subject entity's DID. The computing system of the relying entity also retrieves data related to the at least one self-issued claim from a distributed ledger, and validates the decrypted cryptographic signature based on the retrieved data from the distributed ledger.

In some cases, the public key associated with the DID is propagated onto the distributed ledger. In such a case, the computing system of the relying entity retrieves the public key from the distributed ledger. Alternatively, or in addition, a hash of the public key or a hash of the at least one self-issued claim is propagated onto the distributed ledger. In such a case, the computing system receives the public key associated with the DID from the device of the subject entity. The computing system also retrieves the hash of the public key or a hash of the at least one self-issued claim from the distributed ledger, and validates the self-issued claim based on the hash of the public key or the hash of the at least one self-issued claim.

In some cases, the computing system of the relying entity also sends a public key of its own to the device of the subject entity, and causes the device of the subject entity to encrypt the identification data with the public key of the relying entity. In response to receiving the encrypted identification data, the computing system decrypts the encrypted identification data by its own private key corresponding to the public key.

In some cases, the computing system of the relying entity also determines that the at least one self-issued claim includes one or more conditions. In response to validation of the self-issued claim, the computing system performs an action to fulfill the one or more conditions. The one or more conditions include, but are not limited to: (1) requiring the relying entity to pay a predetermined amount of cryptocurrency, (2) requiring the relying entity to provide identification information of a user, (3) requiring the relying entity to provide one or more verifiable claims of a user, (4) requiring the relying entity to grant permission for accessing a portion of data, and/or (5) requiring the relying entity to provide a particular service.

As such, the claimed embodiments allow entities to securely self-identify themselves with each other, and also allow entities to validate other entity's self-identification data. Further, the self-identification data is only presented to the intended relying entities based on need, such that the users' privacy is not only protected from irrelevant entities but also protected from centralized service providers.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIG. 7A illustrates an example user interface of a management module that receives a user input for generating a self-issued claim;

FIG. 7B illustrates an example user interface of a management module that receives a user input for updating mapping data that maps one or more relying entities to one or more self-issued claims;

FIG. 13 illustrates a flowchart of an example method for receiving and validating identification data by a computing system of a relying entity.

DETAILED DESCRIPTION

The embodiments described herein are related to decentralized identification anchored by decentralized identifiers (DIDs), which allows users to securely identify themselves with a relying entity and allows the relying entity to validate the identification via cryptographic signature and data propagated onto a distributed ledger. Some of the embodiments described herein are implemented at computing systems of subject entities. Some of the embodiments described herein are implemented at computing systems of relying entities.

Because the principles described herein is performed in the context of a computing system, some introductory discussion of a computing system will be described with respect to FIG. 1. Then, this description will return to the principles of the DID platform with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that are executed by a processor. The memory takes any form and depends on the nature and form of the computing system. A computing system is distributed over a network environment and includes multiple constituent computing systems.

Figure 1:
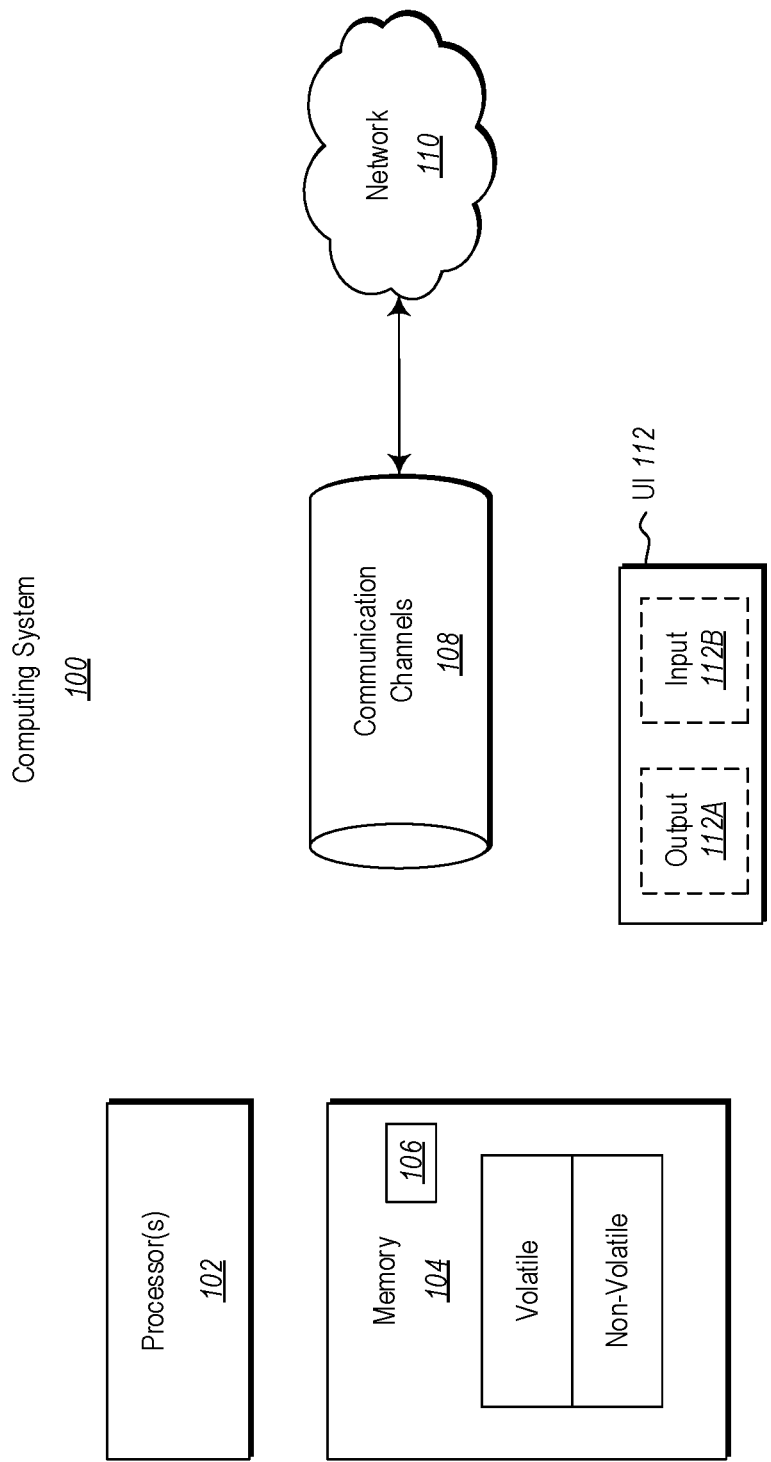
FIG. 1 illustrates an example computing system in which the principles described herein may be employed.

As illustrated in FIG. 1, in its most basic configuration, a computing system 100 typically includes at least one hardware processing unit 102 and memory 104. The processing unit 102 includes a general-purpose processor and also includes a field-programmable gate array (FPGA), an application-specific integrated circuit (ASIC), or any other specialized circuit. The memory 104 is physical system memory, which is volatile, non-volatile, or some combination of the two. The term "memory" also be used herein to refer to non-volatile mass storage such as physical storage media. If the computing system is distributed, the processing, memory and/or storage capability is distributed as well.

The computing system 100 also has thereon multiple structures often referred to as an "executable component". For instance, memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component include software objects, routines, methods, and so forth, that is executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure is computer-readable directly by the processors (as is the case if the executable component were binary). Alternatively, the structure is structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions are embodied on one or more computer-readable media that form a computer program product. An example of such an operation involves the manipulation of data. If such acts are implemented exclusively or near-exclusively in hardware, such as within an FPGA or an ASIC, the computer-executable instructions are hardcoded or hard-wired logic gates. The computer-executable instructions (and the manipulated data) is stored in the memory 104 of the computing system 100. Computing system 100 also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 includes output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse or other pointer input, sensors of any type, and so forth.

Embodiments described herein comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions configure the computing system to perform a certain function or group of functions. The computer executable instructions are, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention is practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. In some cases, the invention also is practiced in distributed system environments where local and remote computing systems, which are linked (either by hardwired data links, wireless data links, or by a combination of hardwired and wireless data links) through a network, both perform tasks. In a distributed system environment, program modules are located in both local and remote memory storage devices.

Those skilled in the art will also appreciate that the invention is practiced in a cloud computing environment. Cloud computing environments are distributed, although this is not required. When distributed, cloud computing environments are distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures discuss various computing system which corresponds to the computing system 100 previously described. The computing systems of the remaining figures include various components or functional blocks that implement the various embodiments disclosed herein as will be explained. The various components or functional blocks are implemented on a local computing system or are implemented on a distributed computing system that includes elements resident in the cloud or that implement aspects of cloud computing. The various components or functional blocks are implemented as software, hardware, or a combination of software and hardware. The computing systems of the remaining figures include more or less than the components illustrated in the figures and some of the components are combined as circumstances warrant. Although not necessarily illustrated, the various components of the computing systems access and/or utilize a processor and memory, such as processor 102 and memory 104, as needed to perform their various functions.

Figure 2:
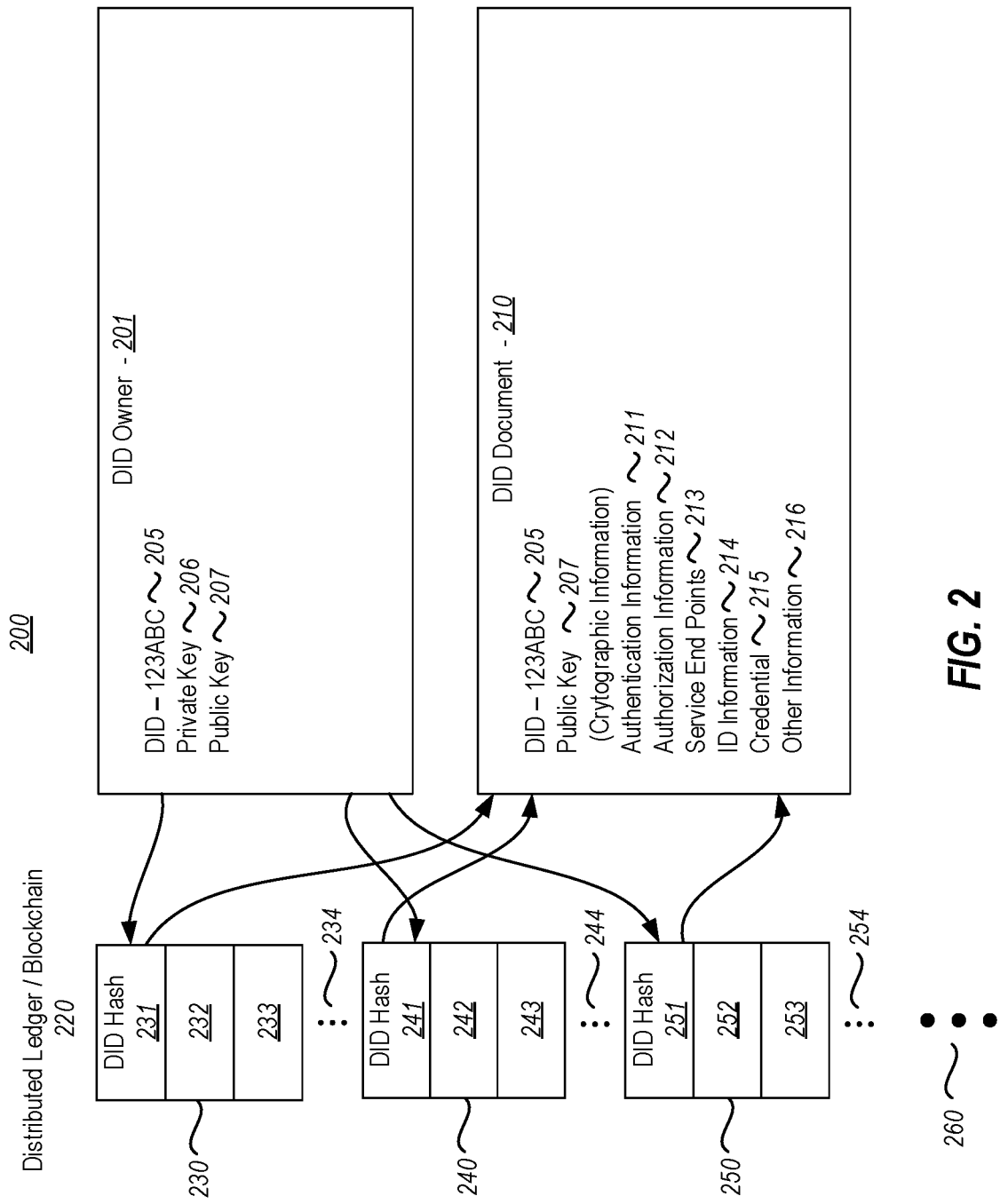
FIG. 2 illustrates an example environment for creating a decentralized identification or identifier (DID)

Some introductory discussions of a decentralized identification (DID) and the environment in which they are created and reside will not be given with respect to FIG. 2. As illustrated in FIG. 2, a DID owner 201 owns or controls a DID 205 that represents an identity of the DID owner 201. The DID owner 201 registers a DID using a creation and registration service, which will be explained in more detail below.

The DID owner 201 is any entity that could benefit from a DID. For example, the DID owner 201 is a human being or an organization of human beings. Such organizations might include a company, department, government, agency, or any other organization or group of organizations. Each individual human being might have a DID while the organization(s) to which each belongs might likewise have a DID.

The DID owner 201 alternatively be a machine, system, or device, or a collection of machine(s), device(s) and/or system(s). In still other embodiments, the DID owner 201 is a subpart of a machine, system or device. For instance, a device could be a printed circuit board, where the subpart of that circuit board are individual components of the circuit board. In such embodiments, the machine or device has a DID and each subpart also have a DID. A DID owner might also be a software component such as the executable component 106 described above with respect to FIG. 1. An example of a complex executable component 106 might be an artificial intelligence. An artificial intelligence also owns a DID.

Thus, the DID owner 201 is any reasonable entity, human or non-human, that is capable of creating the DID 205 or at least having the DID 205 created for and associated with them. Although the DID owner 201 is shown as having a single DID 205, this need not be the case as there is any number of DIDs associated with the DID owner 201 as circumstances warrant.

As mentioned, the DID owner 201 creates and registers the DID 205. The DID 205 is any identifier that is associated with the DID owner 201. Preferably, that identifier is unique to that DID owner 201, at least within a scope in which the DID is anticipated to be in use. As an example, the identifier is a locally unique identifier, and perhaps more desirably a globally unique identifier for identity systems anticipated to operate globally. In some embodiments, the DID 205 is a Uniform Resource Identifier (URI) (such as a Uniform Resource Locator (URL)) or other pointers that relates the DID owner 201 to mechanism to engage in trustable interactions with the DID owner 201.

The DID 205 is "decentralized" because it does not require a centralized, third party management system for generation, management, or use. Accordingly, the DID 205 remains under the control of the DID owner 201. This is different from conventional centralized IDs based trust on centralized authorities and that remain under control of the corporate directory services, certificate authorities, domain name registries, or other centralized authority (referred to collectively as "centralized authorities" herein). Accordingly, the DID 205 is any identifier that is under the control of the DID owner 201 and independent of any centralized authority.

In some embodiments, the structure of the DID 205 is as simple as a username or some other human-understandable term. However, in other embodiments, the DID 205 preferably be a random string of numbers and letters for increased security. In one embodiment, the DID 205 is a string of 128 letters and numbers. Accordingly, the embodiments disclosed herein are not dependent on any specific implementation of the DID 205. In a very simple example, the DID 205 is shown as "123ABC".

As also shown in FIG. 2, the DID owner 201 has control of a private key 206 and public key 207 pair that are associated with the DID 201. Because the DID 205 is independent of any centralized authority, the private key 206 should at all times be fully in control of the DID owner 201. That is, the private and public keys should be generated in a decentralized manner that ensures that they remain under the control of the DID owner 201.

As will be described in more detail to follow, the private key 206 and public key 207 pair is generated on a device controlled by the DID owner 201. The private key 206 and public key 207 pairs should not be generated on a server controlled by any centralized authority as this causes the private key 206 and public key 207 pairs to not be fully under the control of the DID owner 201 at all times. Although FIG. 2 and this description have described a private and public key pair, it will also be noted that other types of reasonable cryptographic information and/or mechanism also be used as circumstances warrant.

FIG. 2 also illustrates a DID document 210 that is associated with the DID 205. As will be explained in more detail to follow, the DID document 210 is generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 is implemented according to methods specified by a distributed ledger 220 that will be used to store a representation of the DID 205 as will be explained in more detail to follow. Thus, the DID document 210 has different methods depending on the specific distributed ledger.

The DID document 210 also includes the public key 207 created by the DID owner 201 or some other equivalent cryptographic information. The public key 207 is used by third-party entities that are given permission by the DID owner 201 to access information and data owned by the DID owner 201. The public key 207 also be used by verifying that the DID owner 201, in fact, owns or controls the DID 205.

The DID document 210 also includes authentication information 211. The authentication information 211 specify one or more mechanisms by which the DID owner 201 is able to prove that the DID owner 201 owns the DID 205. In other words, the mechanisms of authentication information 211 show proof of a binding between the DID 205 (and thus it's DID owner 201) and the DID document 210. In one embodiment, the authentication information 211 specifies that the public key 207 be used in a signature operation to prove the ownership of the DID 205. Alternatively, or in addition, the authentication information 211 specifies that the public key 207 be used in a biometric operation to prove ownership of the DID 205. Accordingly, the authentication information 211 includes any number of mechanisms by which the DID owner 201 is able to prove that the DID owner 201 owns the DID 205.

The DID document 210 also includes authorization information 212. The authorization information 212 allows the DID owner 201 to authorize third party entities the rights to modify the DID document 210 or some part of the document without giving the third party the right to prove ownership of the DID 205. For example, the authorization information 212 allows the third party to update any designated set of one or more fields in the DID document 210 using any designated update mechanism. Alternatively, the authorization information allows the third party to limit the usages of DID 205 by the DID owner 201 for a specified time period. This is useful when the DID owner 201 is a minor child and the third party is a parent or guardian of the child. The authorization information 212 allows the parent or guardian to limit the use of the DID 205 until such time as the child is no longer a minor.

The authorization information 212 also specifies one or more mechanisms that the third party will need to follow to prove they are authorized to modify the DID document 210. In some embodiments, this mechanism is similar to those discussed previously with respect to the authentication information 211.

The DID document 210 also includes one or more service endpoints 213. A service endpoint includes a network address at which a service operates on behalf of the DID owner 201. Examples of specific services include discovery services, social networks, file storage services such as identity servers or hubs, and verifiable claim repository services. Accordingly, the service endpoints 213 operate as pointers for the services that operate on behalf of the DID owner 201. These pointers are used by the DID owner 201 or by third party entities to access the services that operate on behalf of the DID owner 201. Specific examples of service endpoints 213 will be explained in more detail to follow.

The DID document 210 further includes identification information 214. The identification information 214 includes personally identifiable information such as the name, address, occupation, family members, age, hobbies, interests, or the like of DID owner 201. Accordingly, the identification information 214 listed in the DID document 210 represents a different persona of the DID owner 201 for different purposes. For instance, a persona is pseudo-anonymous, e.g., the DID owner 201 include a pen name in the DID document when identifying him or her as a writer posting articles on a blog; a persona is fully anonymous, e.g., the DID owner 201 only want to disclose his or her job title or other background data (e.g., a school teacher, an FBI agent, an adult older than 21 years old, etc.) but not his or her name in the DID document; and a persona is specific to who the DID owner 201 is as an individual, e.g., the DID owner 201 includes information identifying him or her as a volunteer for a particular charity organization, an employee of a particular corporation, an award winner of a particular award, etc.

The DID document 210 also includes credential information 215, which also be referred to herein as an attestation. The credential information 215 is any information that is associated with the DID owner 201's background. For instance, the credential information 215 is (but not limited to) a qualification, an achievement, a government ID, a government right such as a passport or a driver's license, a digital asset provider or bank account, a university degree or other educational history, employment status and history, or any other information about the DID owner 201's background.

The DID document 210 also includes various other information 216. In some embodiments, the other information 216 includes metadata specifying when the DID document 210 was created and/or when it was last modified. In other embodiments, the other information 216 includes cryptographic proofs of the integrity of the DID document 210. In still further embodiments, the other information 216 includes additional information that is either specified by the specific method implementing the DID document or desired by the DID owner 201.

FIG. 2 also illustrates a distributed ledger or blockchain 220. The distributed ledger 220 is any decentralized, distributed network that includes various computing systems that are in communication with each other. For example, the distributed ledger 220 includes a first distributed computing system 230, a second distributed computing system 240, a third distributed computing system 250, and any number of additional distributed computing systems as illustrated by the ellipses 260. The distributed ledger or blockchain 220 operates according to any known standards or methods for distributed ledgers. Examples of conventional distributed ledgers that correspond to the distributed ledger or blockchain 220 include, but are not limited to, Bitcoin [BTC], Ethereum, and Litecoin.

In the context of DID 205, the distributed ledger or blockchain 220 is used to store a representation of the DID 205 that points to the DID document 210. In some embodiments, the DID document 210 is stored on the actually distributed ledger. Alternatively, in other embodiments the DID document 210 is stored in a data storage (not illustrated) that is associated with the distributed ledger or blockchain 220.

As mentioned, a representation of the DID 205 is stored on each distributed computing system of the distributed ledger or blockchain 220. For example, in FIG. 2 this is shown as the DID has 231, DID has 241, and DID has 251, which are ideally identical copies of the same DID. The DID hash 231, DID hash 241, and DID hash 251 then point to the location of the DID document 210. The distributed ledger or blockchain 220 also store numerous other representations of other DIDs as illustrated by references 232, 233, 234, 242, 243, 244, 252, 253, and 254.

In one embodiment, when the DID owner 201 creates the DID 205 and the associated DID document 210, the DID has 231, DID has 241, and DID hash 251 are written to the distributed ledger or blockchain 220. The distributed ledger or blockchain 220 thus records that the DID 205 now exists. Since the distributed ledger or blockchain 220 is decentralized, the DID 205 is not under the control of any entity outside of the DID owner 201. The DID hash 231, DID has 241, and DID has 251 includes, in addition to the pointer to the DID document 210, a record or timestamp that specifies when the DID 205 was created. At a later date when modifications are made to the DID document 210, this also is recorded in DID has 231, DID has 241, and DID has 251. The DID has 231, DID has 241, and DID hash 251 further includes a copy of the public key 207 so that the DID 205 is cryptographically bound to the DID document 210.

Figure 3:
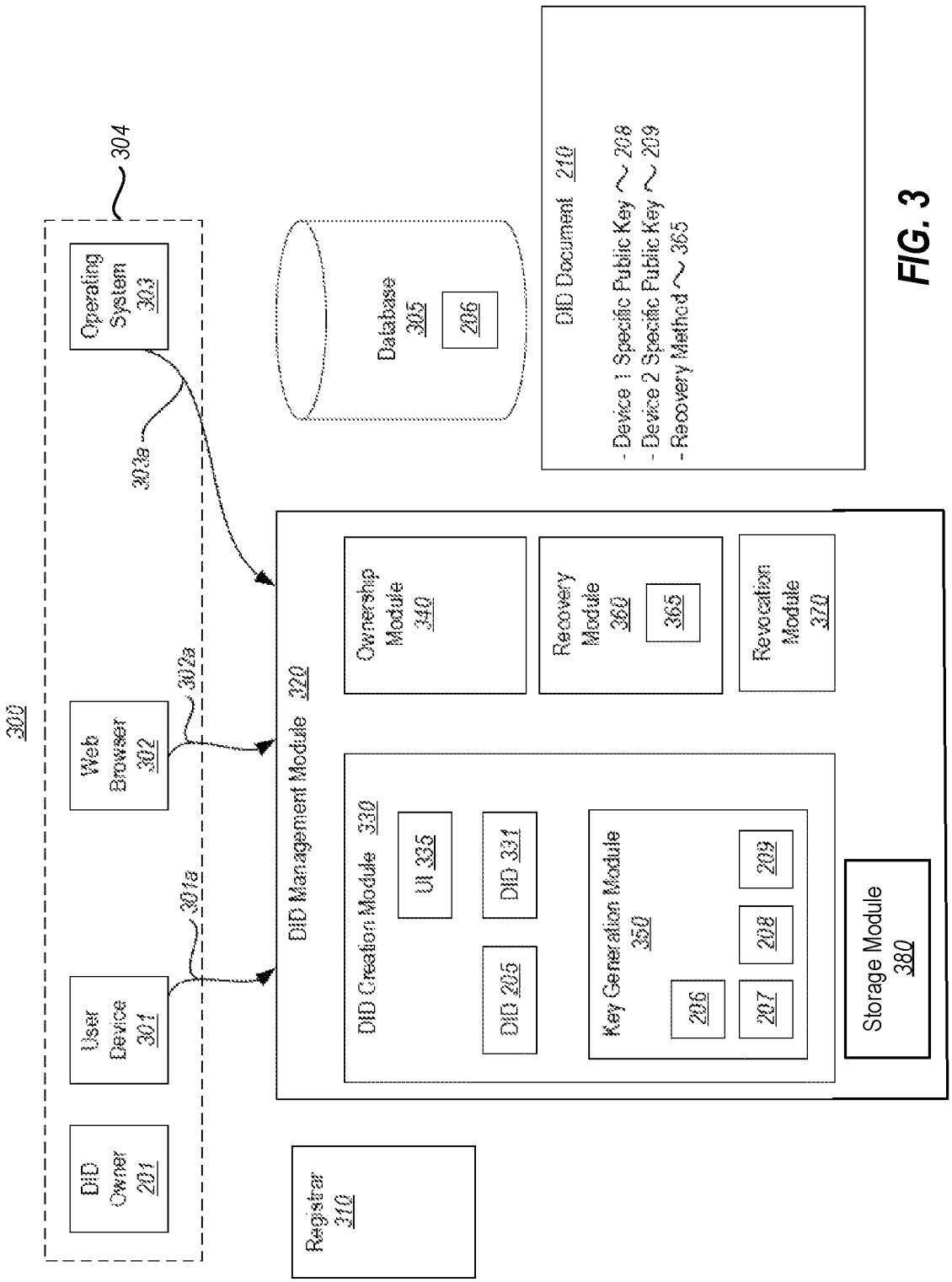
FIG. 3 illustrates an example environment for various DID management operations and services.

Having described DIDs and how they operate generally with reference to FIG. 2, specific embodiments of DIDs will now be explained. Turning to FIG. 3, an environment 300 that is used to perform various DID lifecycle management operations and services will now be explained. It will be appreciated that the environment of FIG. 3 reference elements from FIG. 2 as needed for ease of explanation.

As shown in FIG. 3, the environment 300 includes various devices and computing systems that are owned or otherwise under the control of the DID owner 201. These include a user device 301. In some cases, the user device 301 is a mobile device such as a smartphone, a computing device such as a laptop computer, or any device such as a car or an appliance that includes computing abilities. The device 301 includes a web browser 302 operating on the device and an operating system 303 operating the device. More broadly speaking, the dashed line 304 represents that all of these devices are owned or otherwise under the control of the DID owner 201.

The environment 300 also includes a DID lifecycle management module 320. Sometimes, the DID lifecycle management module 320 also be referred to as a wallet or an agent. It will be noted that in operation, the DID lifecycle management module 320 reside on and be executed by one or more of user device 301, web browser 302, and the operating system 303 as illustrated by the lines 301a, 302a, and 303a. Accordingly, DID lifecycle management module 320 is shown as being separate for ease of explanation.

As shown in FIG. 3, the DID lifecycle management module 320 includes a DID creation module 330. The DID creation module 330 is used by the DID owner 201 to create the DID 205 or any number of additional DIDs, such as DID 331. In one embodiment, the DID creation module includes or otherwise has access to a User Interface (UI) element 335 that guide the DID owner 201 in creating the DID 205. The DID creation module 330 has one or more drivers that are configured to work with the particular distributed ledgers such as distributed ledger 220 so that the DID 205 complies with the underlying methods of that distributed ledger.

A specific embodiment will now be described. For example, UI 335 provides a prompt for the user to enter a username or some other human recognizable name. This name is used as a display name for the DID 205 that will be generated. As previously described, the DID 205 is a long string of random numbers and letters and so having a human recognizable name for a display name be advantageous. The DID creation module 330 then generates the DID 205. In the embodiments having the UI 335, the DID 205 is shown in a listing of identities and is associated with the human recognizable name.

The DID creation module also includes a key generation module 350. The key generation module generates the private key 206 and public key 207 pairs previously described. The DID creation module 330 then uses the DID 205 and the private and public key pair to generate the DID document 210.

In operation, the DID creation module 330 accesses a registrar 310 that is configured to the specific distributed ledger that will be recording the transactions related to the DID 205. The DID creation module 330 uses the registrar 310 to record the DID hash 231, DID hash 241, and DID hash 251 in the distributed ledger in the manner previously described and to store the DID document 210 in the manner previously described. This process uses the public key 207 in the has generation.

In some embodiments, the DID lifecycle management module 320 includes an ownership module 340. The ownership module 340 provides mechanisms that ensure that the DID owner 201 is aware that the DID owner 201 is in sole control of the DID 205. In this way, the provider of the DID lifecycle management module 320 is able to ensure that the provider does not control the DID 205, but is only providing the management services.

As previously discussed, the key generation module 350 generates the private key 206 and public key 207 pair and the public key 207 is then recorded in the DID document 210. Accordingly, the public key 207 is used by all devices associated with the DID owner 201 and all third parties that desire to provide services to the DID owner 201. Accordingly, when the DID owner 201 desires to associate a new device with the DID 205, the DID owner 201 executes the DID creation module 330 on the new device. The DID creation module 330 then uses the registrar 310 to update the DID document 210 to reflect that the new device is now associated with the DID 205 and this would be reflected in an updated transaction on the distributed ledger 220 as previously described.

In some embodiments, however, it is advantageous to have a public key per device 301 owned by the DID owner 201 as this allows the DID owner 201 to sign with the specific device public key without having to access a general public key. In other words, since the DID owner 201 will use different devices at different times (for example using a mobile phone in one instance and then using a laptop computer in another instance) it is advantageous to have a key associated with each device to provide efficiencies in signing using the keys. Accordingly, in such embodiments, the key generation module generates additional public keys 208 and 209 when the additional devices execute the DID creation module 330. These additional public keys are associated with private key 206 or in some instances is paired with a new private key.

In those embodiments where the additional public keys 208 and 209 are associated with different devices, the additional public keys 208 and 209 are recorded in the DID document 210 as being associated with those devices. This is shown in FIG. 3. It will be appreciated that the DID documents 210 include the information previously described in relation to FIG. 2 in addition to the information shown in FIG. 3. If the DID document 210 existed prior to the device-specific public keys being generated, then the DID document 210 would be updated by the creation module 330 via the registrar 310 and this would be reflected in an updated transaction on the distributed ledger 220.

In some embodiments, the DID owner 201 can keep the association of a device with a public key or even with the DID 205 a secret. Accordingly, the DID creation module 330 causes that such data be secretly shown in the DID document 210.

As described thus far, the DID 205 has been associated with all the devices under the control of the DID owner 201, even when the devices have their own public keys. However, in some embodiments it is useful for each device or some subset of devices under the control of the DID owner 201 to each have their own DID. Thus, in some embodiments the DID creation module 330 generates an additional DID, for example, DID 331, for each device. The creation module would then generate private and public key pairs and DID documents for each of the devices and have them recorded on the distributed ledger 220 in the manner previously described. Such embodiments are advantageous for devices that change ownership as it is possible to associate the specific device DID to the new owner of the device by granting the new owner authorization rights in the DID document and revoking such rights from the old owner.

As mentioned, the private key, to ensure that it is totally in the control of the DID owner 201, is created on the user device 301, browser 302, or operating system 303 owned or controlled by the DID owner 201 that executed the DID management module 320. In this way, there is little chance that a third party gains control of the private key 206, especially the provider of the DID lifecycle management module 320. However, there is a chance that the device storing the private key 206 is lost by the DID owner 201, which causes the DID owner 201 to lose access to the DID 205. Accordingly, in some embodiments, the UI 335 includes the option to allow the DID owner 201 to export the private key 206 to an off device secured database 305 that is under the control of the DID owner 201. In some embodiments, the private key 206 is stored as a QR code that scanned by the DID owner 201.

In other embodiments, the DID lifecycle management module 320 includes a recovery module 360 that is used to recover a lost private key 206. In operation, the recovery module 360 allows the DID owner 201 to select one or more recovery mechanisms 365 at the time the DID 205 is created that later be used to recover the lost private key. In those embodiments having the UI 335, the UI 335 allow the DID owner 201 to provide required information that will be needed by the one or more recovery mechanisms 365 when the recovery mechanisms are implemented. The recovery module then be run on any device associated with the DID 205.

The DID lifecycle management module 320 also includes a revocation module 370 that is used to revoke or sever a device from the DID 205. In operation, the revocation module uses the UI element 335, which allows the DID owner 201 to indicate a desire to remove a device from being associated with the DID 205. In one embodiment, the revocation module access the DID document 210 and causes that all references to the device be removed from the DID document. Alternatively, the public key for the device is removed. This change in the DID document 210 then is reflected as an updated transaction on the distributed ledger 220 as previously described.

Figure 4:
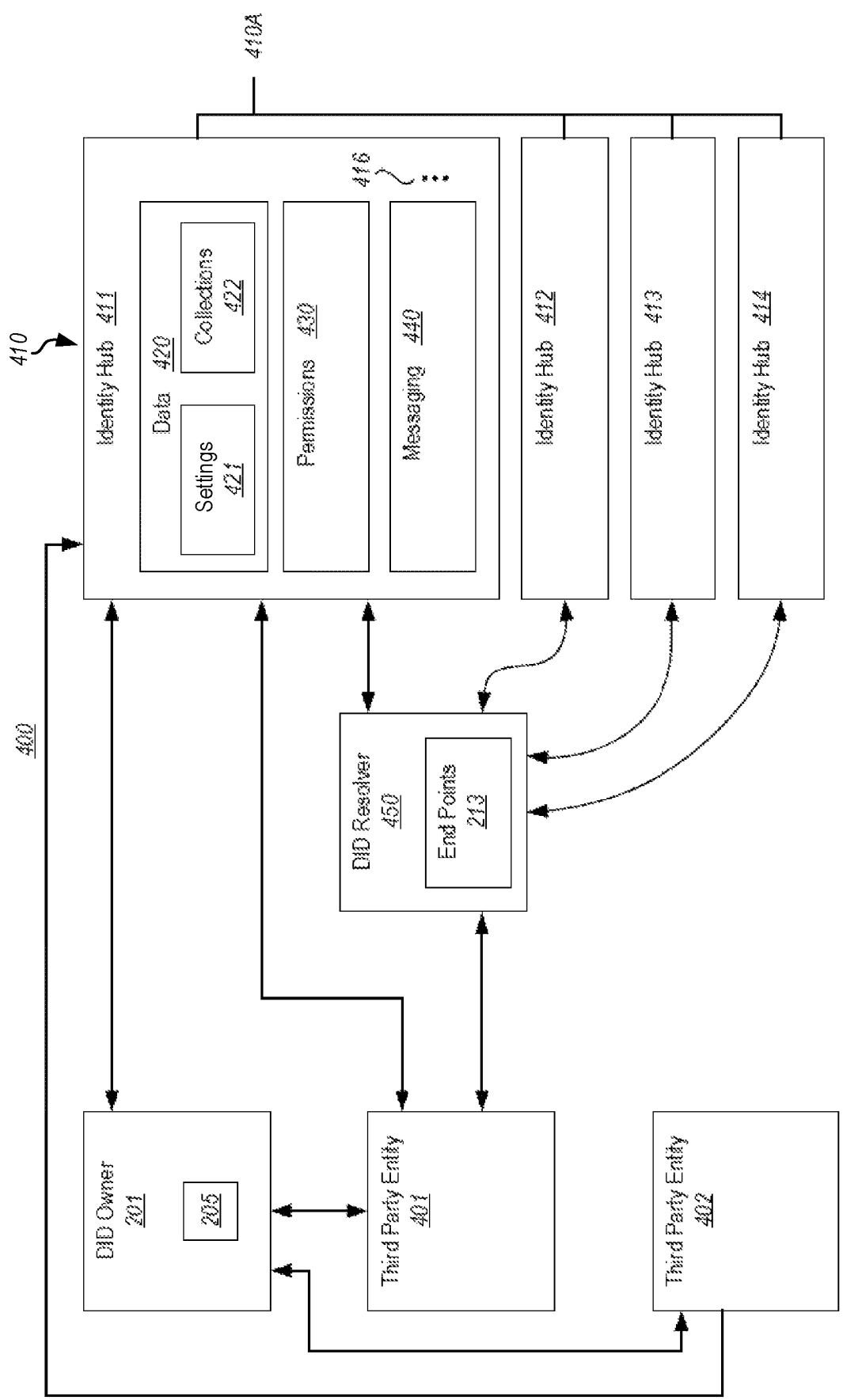
FIG. 4 illustrates an example decentralized personal storage or identity hub.

FIG. 4 illustrates an embodiment of an environment 400 in which a DID such as DID 205 is utilized. Specifically, the environment 400 will be used to describe the use of the DID 205 in relation to one or more decentralized personal storages or identity hubs. An identity hub is a storage of attributes, including keys and metadata under the control of the holder of the DID. It will be noted that FIG. 4 includes references to elements first discussed in relation to FIG. 2 or 3 and thus use the same reference numeral for ease of explanation.

In one embodiment, the identity hubs 410 are multiple instances of the same identity hub. This is represented by line 410A. Thus, the various identity hubs 410 include at least some of the same data and services. Accordingly, if any change is made to one of the identity hubs 410, the change is reflected in the remaining identity hubs. For example, the first identity hub 411 and second identity hub 412 are implemented in cloud storage and thus is able to hold a large amount of data. Accordingly, a full set of the data is stored in these identity hubs. However, the identity hubs 412 and 413 have less memory space. Accordingly, in these identity hubs a descriptor of the data stored in the first and second identity hubs is included. Alternatively, a record of changes made to the data in other identity hubs is included. Thus, changes in one of the identity hubs 410 are either fully replicated in the other identity hubs or at least a record or descriptor of that data is recorded in the other identity hubs.

Because the identity hubs are multiple instances of the same identity hub, only a full description of the first identity hub 411 will be provided as this description also applies to the identity hubs 412-415. As illustrated, identity hub 411 includes data storage 420. The data storage 420 is used to store any type of data that is associated with the DID owner 201. In one embodiment the data is a collection 422 of a specific type of data corresponding to a specific protocol. For example, in some cases, collection 422 is medical records data that corresponds to a specific protocol for medical data. In some other cases, collection 422 is any other type of data.

In one embodiment, the stored data have different authentication and privacy settings 421 associated with the stored data. For example, a first subset of the data has a setting 421 that allows the data to be publicly exposed, but that does not include any authentication to the DID owner 201. This type of data is for relatively unimportant data such as color schemes and the like. A second subset of the data has a setting 421 that allows the data to be publicly exposed and that includes authentication to the DID owner 201. A third subset of the data has a setting 421 that encrypts the subset of data with the private key 206 and public key 207 pair (or some other key pair) associated with the DID owner 201. This type of data will require a party to have access to the public key 207 or to some other associated public key in order to decrypt the data. This process also includes authentication to the DID owner 201. A fourth subset of the data has a setting 421 that restricts this data to a subset of third parties. This requires that public keys associated with the subset of third parties be used to decrypt the data. For example, the DID owner 201 causes the setting 421 to specify that only public keys associated with friends of the DID owner 201 decrypt this data.

In some embodiments, the identity hub 411 has a permissions module 430 that allows the DID owner 201 to set specific authorization or permissions for third parties such as third parties 401 and 402 to access the identity hub. For example, the DID owner 201 provides access permission to his or her spouse to all the data 420. Alternatively, the DID owner 201 allows access to his or her doctor for any medical records. It will be appreciated that the DID owner 201 permission to any number of third parties to access a subset of the data 420. This will be explained in more detail to follow.

The identity hub 411 also has a messaging module 440. In operation, the messaging module allows the identity hub to receive messages such as requests from parties such as third parties 401 and 402 to access the data and services of the identity hub. In addition, the messaging module 440 allows the identity hub 411 to respond to the messages from the third parties and to also communicate with a DID resolver 450. This will be explained in more detail to follow. The ellipses 416 represent that the identity hub 411 has additional services as circumstances warrant.

In one embodiment, the DID owner 201 wish to authenticate a new device 301 with the identity hub 411 that is already associated with the DID 205 in the manner previously described. Accordingly, the DID owner 201 utilizes the DID management module 320 associated with the new user device 301 to send a message to the identity hub 411 asserting that the new user device is associated with the DID 205 of the DID owner 201.

However, the identity hub 411 not initially recognize the new device as being owned by the DID owner 201. Accordingly, the identity hub 411 uses the messaging module 440 to contact the DID resolver 450. The message sent to the DID resolver 450 includes the DID 205.

The DID resolver 450 is a service, application, or module that is configured in operation to search the distributed ledger 220 for DID documents associated with DIDs. Accordingly, in the embodiment the DID resolver 450 search the distributed ledger 220 using the DID 205, which result in the DID resolver 450 finding the DID document 210. The DID document 210 then be provided to the identity hub 411.

As discussed previously, the DID document 210 includes a public key 208 or 209 that is associated with the new user device 301. To verify that the new user device is owned by the DID owner 201, the identity hub 411 provides a cryptographic challenge to the new user device 301 using the messaging module 440. This cryptographic challenge will be structured such that only a device having access to the private key 206 will be able to successfully answer the challenge In the embodiment, since the new user device is owned by DID owner 201 and thus has access to the private key 206, the challenge is successfully answered. The identity hub 411 then records in the permissions 430 that the new user device 301 is able to access the data and services of the identity hub 411 and also the rest of the identity hubs 210.

It will be noted that this process of authenticating the new user device 301 was performed without the need for the DID owner 201 to provide any username, password or the like to the provider of the identity hub 411 (i.e., the first cloud storage provider) before the identity hub 411 could be accessed. Rather, the access was determined in a decentralized manner based on the DID 205, the DID document 210, and the associated public and private keys. Since these were at all times in the control of the DID owner 201, the provider of the identity hub 411 was not involved and thus has no knowledge of the transaction or of any personal information of the DID owner 201.

In another example embodiment, the DID owner 201 provide the DID 205 to the third party entity 401 so that the third party access data or services stored on the identity hub 411. For example, the DID owner 201 is a human who is at a scientific conference who desires to allow the third party 401, who is also a human, access to his or her research data. Accordingly, the DID owner 201 provide the DID 205 to the third party 401.

Once the third party 401 has access to the DID 205, he or she access the DID resolver 450 to access the DID document 210. As previously discussed, the DID document 210 include an endpoint 213 that is an address or pointer to the identity hub 411. The third party 401 then use the address or pointer to access the identity hub 411.

The third party 401 send a message to the messaging module 440 asking for permission to access the research data. The messaging module 440 then send a message to the DID owner 201 asking if the third party 401 should be given access to the research data. Because the DID owner desires to provide access to this data, the DID owner 201 allow permission to the third party 401 and this permission is recorded in the permissions 430.

The messaging module 440 then message the third party 401 informing the third party that he or she is able to access the research data. The identity hub 411 and the third party 401 then directly communicate so that the third party access the data. It will be noted that in many cases, it will actually be an identity hub associated with the third party 401 that communicates with the identity hub 411. However, it a device of the third party 401 that does the communication.

Advantageously, the above-described process allows the identity hub 411 and the third party 401 to communicate and to share the data without the need for the third party to access the identity hub 411 in a conventional manner. Rather, the communication is provisioned in a decentralized manner using the DID 205 and the DID document 210. This advantageously allows the DID owner to be in full control of the process.

As briefly discussed above, the identity hub 411 is hosted in a cloud service. The service provider has access to the data stored in each user's identity hub 411. Furthermore, the service provider also has access to certain activities of the DID owner. For example, the entities with whom the DID owner has shared his/her data is stored in the identity hub 411. As another example, a user has multiple DIDs and has shared data amongst the multiple DIDs, alternatively, the user has used different DID management modules to access the same data. Based on the data sharing activities, the service provider of the identity hub 411 correlate the relationships of different DIDs and find out that two DIDs is related or owned by the same owner. Thus, the user's privacy is compromised.

The principles described herein will solve these potential privacy concerns of DID owners by encrypting the personal data stored in the identity hub 411. The encryption/decryption keys are not stored or accessible by the identity hub 411, so that the DID owners not only have great control over their data from other DID owners or users, but also have their privacy protected from the service providers.

There are many different objects stored in the identity hub 411. A data object is a file, a folder, or any portion of data stored in the identity hub 411. The whole identity hub 411 is encrypted with one encryption/decryption key as one object. Alternatively, a different portion of the data stored in the identity hub 411 is encrypted with different encryption/decryption keys.

In another example embodiment, verifiable claims are issued and stored at the identity hub 411. For example, a verifiable claim that is associated with a DID owner 201 is issued by a claim issuing entity, and the issued verifiable claim is stored at the identity hub 411 that is associated with the DID owner 201. The DID owner 201 send the verifiable claim to another entity when the other entity requires to verify the credential of the DID owner. For example, the DID owner 201 is a person holding a driver's license, and the claim issuing entity is a DMV that has issued the DID owner's driver's license. The DMV issue a verifiable claim that verifies that the DID owner 201 is holding a valid driver's license. The DID owner 201 stores the verifiable claim in the identity hub 411. Another entity is a rental car company, which requires the DID owner 201 to show that he/she has a valid driver's license. The DID owner then sends the verifiable claim stored at the identity hub 411 to the rental car company.

Figure 5:
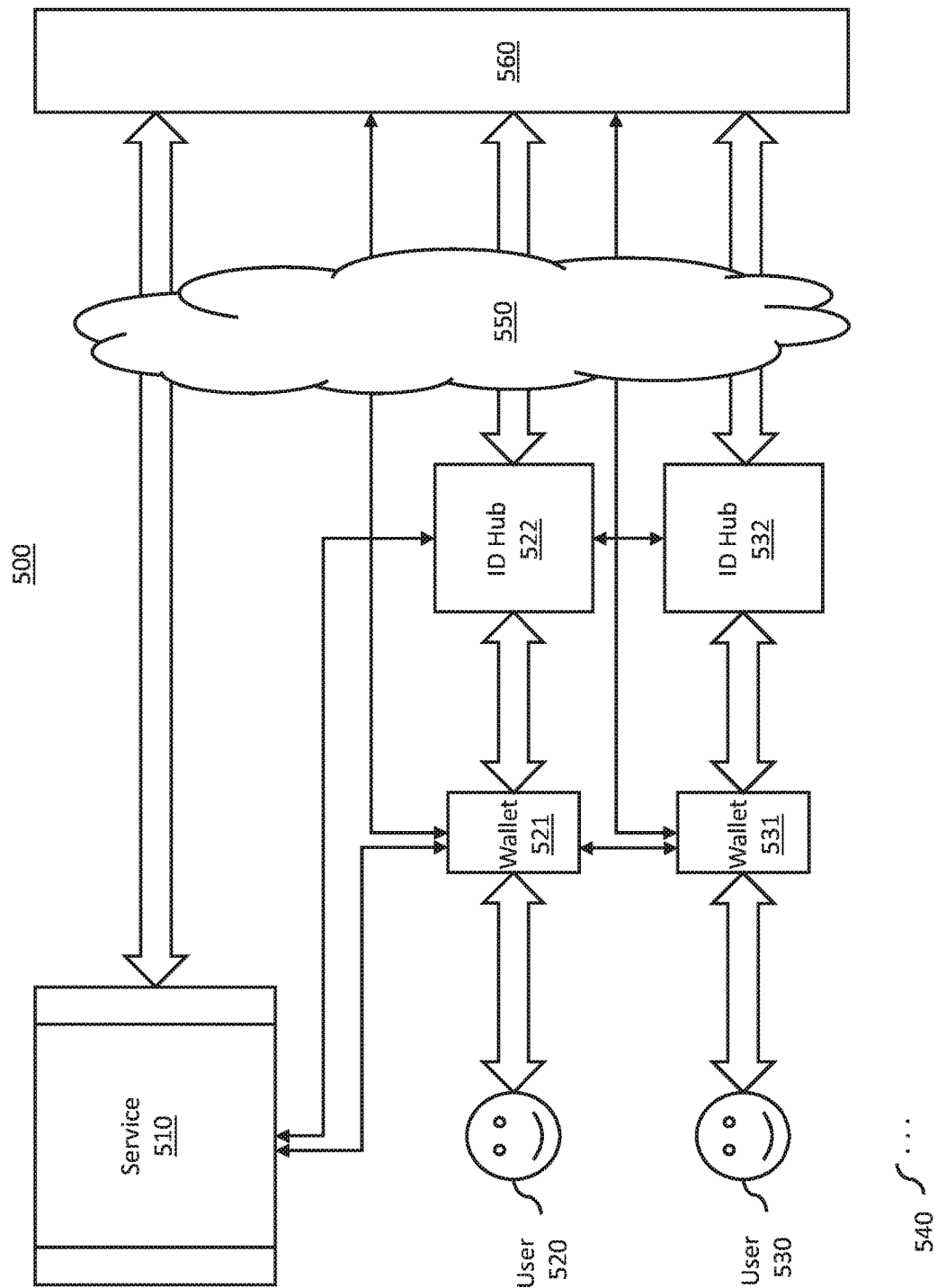
FIG. 5 illustrates an example environment, in which the principles described herein are implemented.

Having described DIDs and how they operate generally with reference to FIGS. 2-4, specific embodiments of decentralized identification will now be explained. Turning to FIG. 5, a decentralized environment 500 that allows DID owners to access services and perform transactions with other DID owners while identifying themselves will now be explained. It will be appreciated that FIG. 5 references elements from FIGS. 2-4 as needed for ease of explanation.

As illustrated in FIG. 5, the decentralized environment 500 includes a device associated with a service provider 510, a wallet apps 521 and 522 of users 520 and 530 (e.g., DID owners). The ellipsis 540 represents that there may be any number of devices associated with any number of service providers and/or users in the decentralized environment 500. Each of the service provider (s) and users 520, 530 corresponds to a DID owner 201 of FIG. 2. The wallet app 521 or 531 corresponds to the DID management module 320 of FIG. 3. The ID hub 522 or ID hub 532 corresponds to the ID hub 411 of FIG. 4.

User 520 uses a wallet app 521 to manage his/her DIDs, and user 520 uses a wallet app 531 to manage his/her DIDs. The wallet app 521 or 531 is connected to a respective ID hub 522 or 531. Each of the service provider's device 510 and wallet apps 521, 531 has access to the distributed ledger via a computer network 550. In some embodiments, the wallet app 521 or 531 has indirect access to the distributed ledger via the ID hub 522 or 532. In some embodiments, the wallet app 521 or 531 is configured to store a complete copy of the distributed ledger or has direct access to the distributed ledger via the computer network 550.

The device of the service provider 510 and each wallet apps 521, 531 and/or ID hubs 522, 532 are capable of communicating with each other via various communication channels, including, but not limited to, local area network, a wide area network, a BLE beacon signal, and/or near field communication (NFC). The communication can also be performed via generating a bar code or a QR code that by one wallet app 521, and scanning the bar code or a QR code by another wallet app 531 or the device of the service provider 510. The barcode or the QR code includes the identification information related to the user 520, such as the DID associated with the user 520.

In some embodiments, the user 520 can request for accessing a service provided by the service provider 510 via the wallet app 521. In the request, the wallet app 321 may or may not include the user's identification information. When the request does not include the user's identification information, the service 510 can request the user's wallet app 521 to provide such information. Subsequently, the wallet app 521 will then send the user's DID and/or additional identification data (e.g., self-issued claims) to the service provider 510.

In some embodiments, to further verify that the user is the true owner of the DID or the device that installs the wallet app 521, the wallet app 521 further requires the user to enter some input to prove that the user is the true owner of the device. For example, in some cases, a device password and/or biometric data (including, but not limited to, fingerprint and irises scan) are required to be entered by the user before the wallet app 521 generates the identification data. Once the service 510 receives the DID and the identification data, the service 510 then retrieves relevant data related to the DID from the distributed ledger, and uses the retrieved data to validate the identification data received from the wallet app 521.

A similar process can also occur between two users' wallet apps 521, 522 to allow the two users 520 and 530 to communicate or conduct transactions with each other. For example, a communication or a transaction can be initiated by wallet app 521 and transmitted to wallet app 531. When the wallet app 531 receives the DID of the user 520, the wallet app 531 generates and sends a self-identification request to wallet app 521. Receiving the self-identification request, wallet app 521 then generates and sends its identification data to wallet app 531. Wallet app 531 then determines the validity of the identification data based on data propagated on the distributed ledger.

The identification data includes one or more self-issued claims. A claim is generally a statement about a subject (e.g., an owner of a DID). In some embodiments, a claim is expressed using a property-value pair. FIG. 6A illustrates an example data structure that represents a claim 610. The claim 610 includes a subject 611, a property 612 and a value 613. For example, the subject 611 corresponds to an owner of a DID, and the DID is recorded as the subject 611. The property 612 may be any property of the owner of the DID, such as a name, a phone number, an email address, etc. The value 613 is the value of the corresponding property 612. For example, when the property is "name", the value would be the name of the owner of the DID, e.g., John Doe; when the property is "phone number", the value would be the phone number of the owner of the DID, e.g., 1-800-123-4567.

Since a claim is merely a statement, an entity can present any statement to any relying entity. When the entity merely presents a claim, the relying entity also has no proof that this statement is issued by the subject entity, such that the relying entity cannot hold the subject entity responsible for the statement presented. This problem is solved by having a cryptographic signature of the subject entity attached to the claim. When a claim is signed by a private key of the subject entity, the claim becomes a "self-issued claim" because the signature proves that the claim is issued by the subject entity.

Figure 6B:
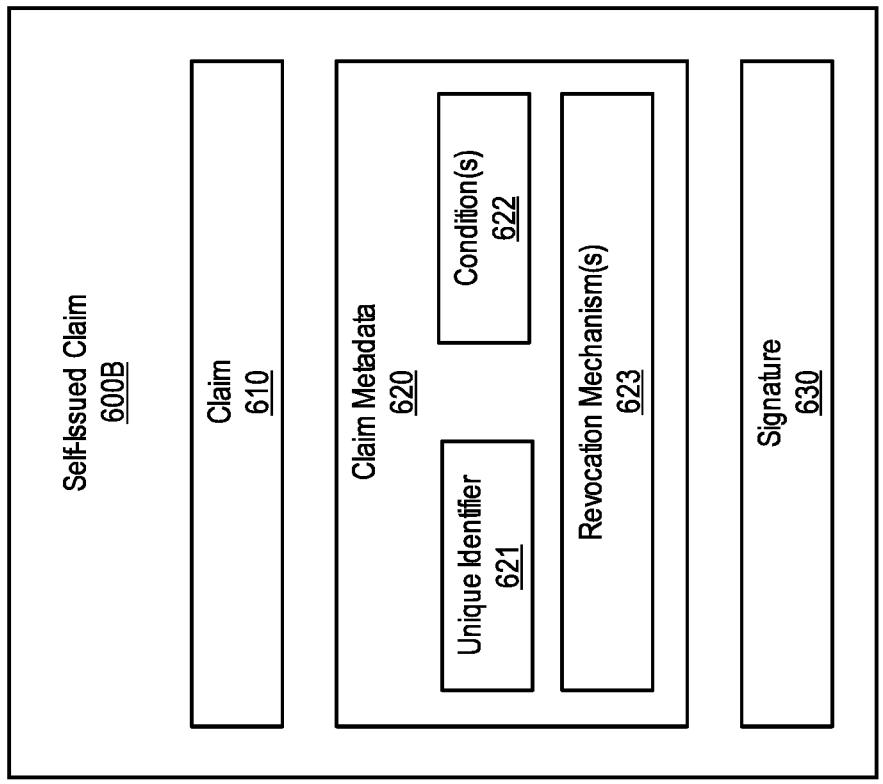
FIG. 6B illustrates an example self-issued claim.
Figure 6A:
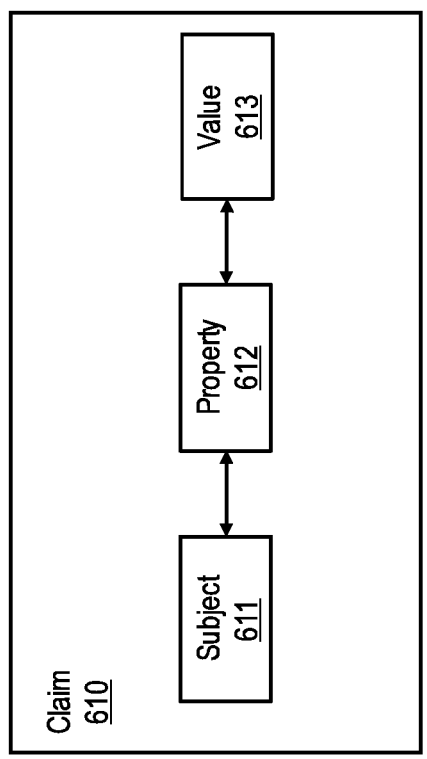
FIG. 6A illustrates an example claim.

FIG. 6B illustrates an example data structure of a self-issued claim 600B. The self-issued claim 600B includes claim 610, which corresponds to the claim 610 of FIG. 6A. The self-issued claim 600B also includes a signature 630, which is generated by signing the claim 610 by a private key of the subject entity (e.g., DID). Once the self-issued claim is generated, at least a portion of data related to the self-issued claim is propagated onto a distributed ledger, such that a relying entity can use the portion of data propagated onto the distributed ledger to validate the self-issued claim. In some embodiments, the public key corresponding to the private key of the subject entity is propagated onto the distributed ledger. In some embodiments, a hash of the public key or a hash of the self-issued claim is propagated onto the distributed ledger.

In some embodiments, the self-issued claim 600B also includes various metadata related to the self-issued claim 600B. For example, the metadata includes, but is not limited to, (1) a unique identifier identifying the corresponding self-issued claim 621, (2) one or more conditions 622 for accessing the self-issued claim, or (3) one or more revocation mechanisms 623 for revoking the corresponding self-issued claim.

The one or more conditions 622 for accessing the self-issued claim include, but are not limited to, (1) requiring the relying entity to pay a predetermined amount of cryptocurrency, (2) requiring the relying entity to provide identification information, (3) requiring the relying entity to provide one or more verifiable claim(s), (4) requiring the relying entity to grant permission for accessing a portion of data, and/or (5) requiring the relying entity to provide a particular service. The one or more revocation mechanisms 623 include, but are not limited to, (1) an expiration time of the corresponding self-issued claim, (2) a predetermined number of times that the corresponding self-issued claim can be accessed, (3) an automatic revocation mechanism that automatically revokes a claim in response to a change of data contained in a DID document of the corresponding DID or personal data of the subject entity, or (4) a manual revocation mechanism that allows the subject entity to manually revoke the self-issued claim.

As described above, computing systems of subject entities are configured to generate and store self-issued claims. In some embodiments, a computing system of a subject entity is configured to retrieve personal data from a DID document of the DID or personal data associated with the subject entity, and use the retrieved data to generate self-issued claim automatically.

In some embodiments, the computing system receives a user input and generates self-issued claims based on the user input. FIG. 7A illustrates an example user interface 700A of a management module of the subject entity that allows users (owner of DIDs) to generate self-issued claims manually. As illustrated in FIG. 7A, the user interface 700A includes selection menu 710A that allows a user to select a DID amongst a list of DIDs owned by the user. The user interface 700A also includes a property menu 720A and a value menu 730A that allow the user to select or enter a property-value pair. Once the user clicks the "generate a self-issued claim" button 740A, the selected or entered DID and property-value pair will be recorded into a self-issued claim and signed by a private key of the selected DID.

When the computing system receives a request for self-identification from a relying entity, the computing system selects one or more self-issued claims and sends the selected one or more self-issued claims to the relying entity. In some embodiments, the selection is based on the request received from the relying entity. Alternatively, the selection is based on a user input on the fly when the request is received.

In yet some other embodiments, multiple self-issued claims are mapped to multiple relying entities, such that when a request from a particular relying entity is received, the computing system automatically retrieves the mapped one or more self-issued claims and generate identification data including the mapped one or more self-issued claims to the relying entity. Such mapping may be performed by the computing system automatically. Alternatively, or in addition, the mapping may be entered and/or updated by users manually.

FIG. 7B illustrates an example user interface 700B of a management module that allows users to manually map one or more self-issued claims to one or more relying entities. As illustrated in FIG. 7B, the user interface 700B includes a relying entity menu 710B, which allows a user to select and/or manually input one or more relying entities. When the relying entity is also an owner of a DID, the DID of the relying entity is listed. The user interface 700B also includes a self-issued claim menu 720B, which allows the user to select one or more existing self-issued claims or generate a new self-issued claim. Once the user clicks the confirm button 730B, the selected/entered relying entities and the self-issued claims are mapped to each other. The mapped relying entities and self-issued claims are then recorded in a mapping data.

Figure 8:
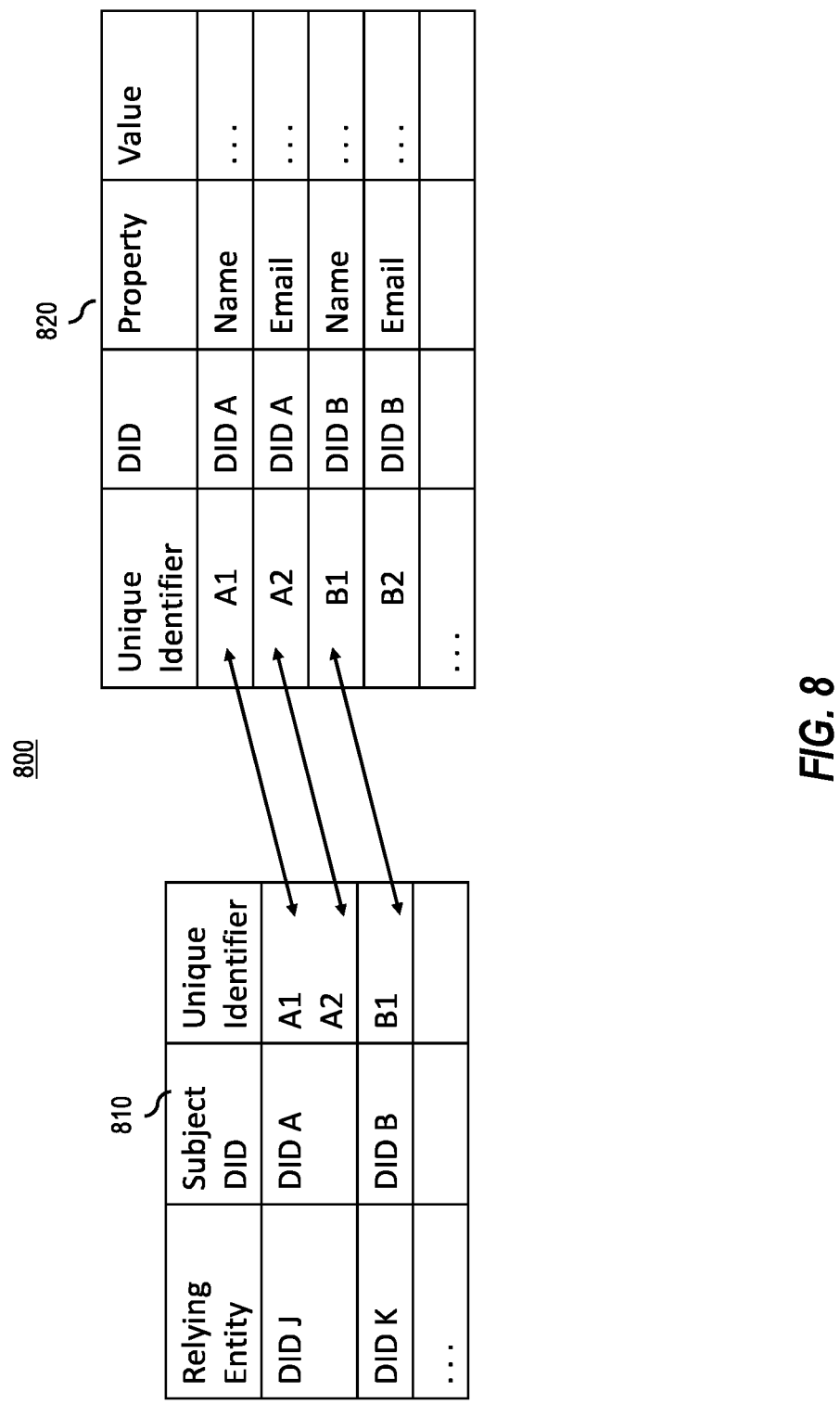
FIG. 8 illustrates an example data structure of mapping data that maps one or more relying entities to one or more self-issued claims.

FIG. 8 illustrates an example data structure 800 of the mapping data. The data structure 800 includes a table 810 that records relying entities and corresponding subject entity and its mapped claims via the unique identifiers of the corresponding claims. The data structure 800 also includes a table 820 that records further details of each claim including claim ID, DID, property and value. The claims recorded in table 820 are mapped to table 810. For example, when the computing system receives a request from a particular relying entity, such as DID J, the computing system retrieves the claim ID (e.g., "A1" and "A2") from table 810, and based on the retrieved claim ID, the computing system then generates identification data including self-issued claims recorded in table 820. For instance, the claim with identifier "A1" includes a name of the subject entity, and the claim with identifier "A2" includes an email of the subject entity. As such, the identification data will include the self-issued claims containing the name and email address of the subject entity.

Tables 810 and 820 are merely an example data structure recording the mapping data. For example, in some embodiments, a single table may be used to recording mapping data. Alternatively, or in addition, additional data (e.g., conditions or revocation mechanisms) may also be recorded in each table 810 or 820.

Figure 9:
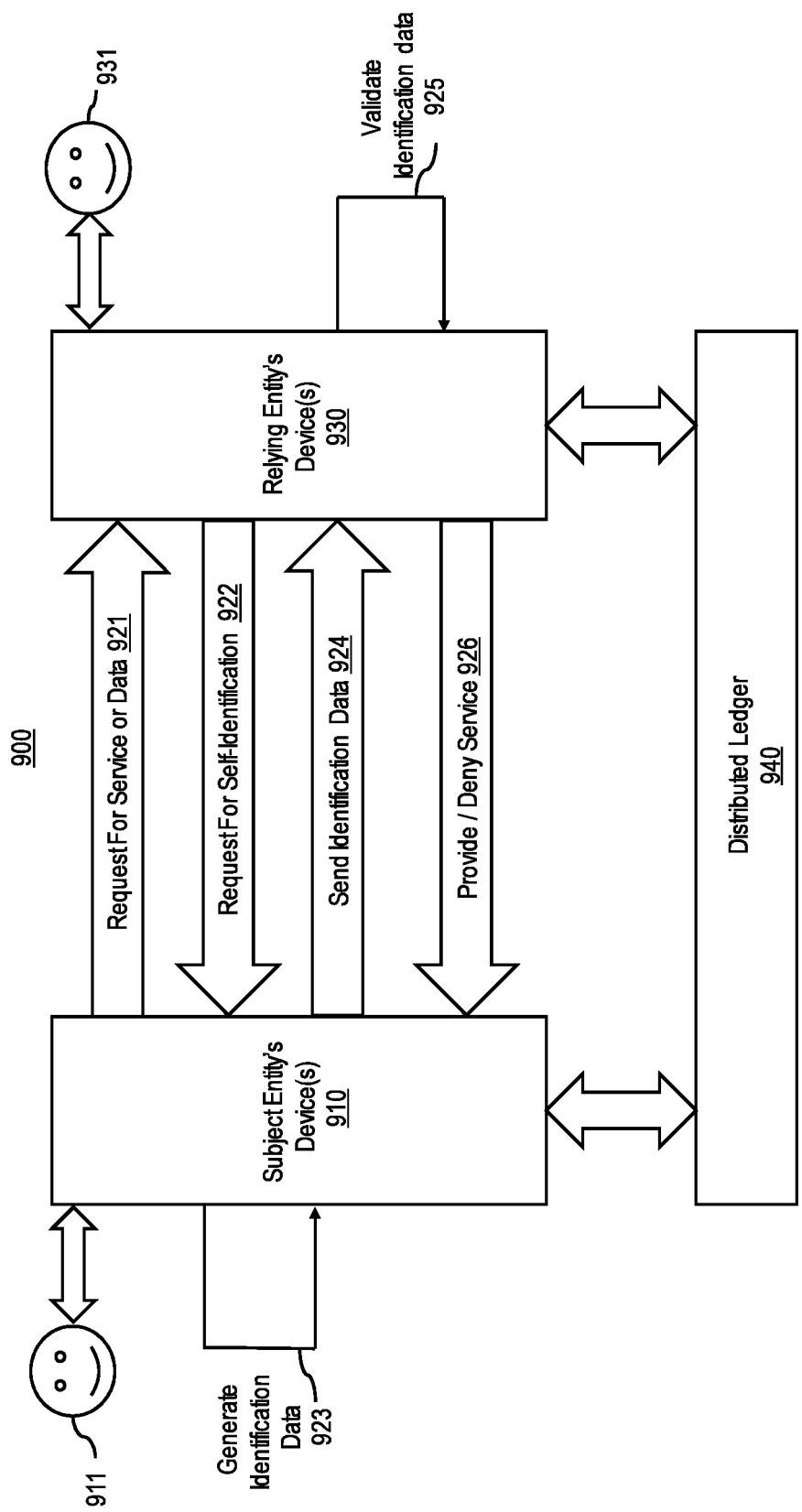
FIG. 9 illustrates an example communication pattern between a subject entity and a relying entity for requesting and validating self-identification data.

FIG. 9 illustrates an example communication pattern 900 that may occur between subject entity's device(s) 910 and relying entity's device(s) 930 when the relying entity 931 requests for self-identification of the subject entity 911. The subject entity's device(s) 910 includes one or more computing systems of the subject entity 911. The relying entity's device(s) 930 includes one or more computing systems of the relying entity 931. As illustrated in FIG. 9, the subject entity 911 is an owner of a DID. The subject entity 911 uses various devices 910 to manage the DID. In many cases, the subject entity 911 likely initiates a request for a service or data first. A computing system of the subject entity 910 then sends the request to the relying entity's device(s) 930, which is represented by arrow 921. Receiving the request from the computing system of the subject entity 910, a computing system of the relying entity 930 would like to know who the requester is. Thus, the computing system of the relying entity 930 sends a request for self-identification to the subject entity's device 910, which is represented by arrow 922. In some embodiments, the request indicates what information the relying entity would like to know, e.g., name, email address, etc.

Receiving the request for self-identification, the computing system of the subject entity 910 then selects one or more self-issued claims and generates identification data (including the one or more self-issued claims), which is represented by arrow 923. In some embodiments, the identification data or the self-issued claims further include one or more conditions. For example, the condition may repeat the request for service or data, and require the relying entity to provide the requested service or data when valid identification data is accessed.

In some embodiments, the one or more self-issued claims are selected based on the relying entity's request. For example, when the request of the relying entity indicates that a name and an email address are required, the computing system of the subject entity selects a claim of name and a claim of email address. In some embodiments, the subject entity's device accesses mapping data that maps multiple relying entities to multiple self-issued claims. For example, FIG. 8 illustrates an example data structure of the mapping data. In such a case, the computing system of the subject entity 910 selects the one or more self-issued claims based on the mapping data.

After the identification data is generated, the computing system of the subject entity 910 sends it to the relying entity's device 930, which is represented by arrow 924. Receiving the identification data from the computing system of the subject entity, the relying entity's device 930 validates the received identification data, which is represented by arrow 925. The validation process includes at least extracting one or more self-issued claims from the received identification data, decrypting a signature of each of the one or more self-issued claims, and validating the decrypted signature based on data propagated on the distributed ledger 940. In response to the result of validation, the relying entity's device 930 then provides or reject the requested service or data, which is represented by arrow 926.

Figure 10B:
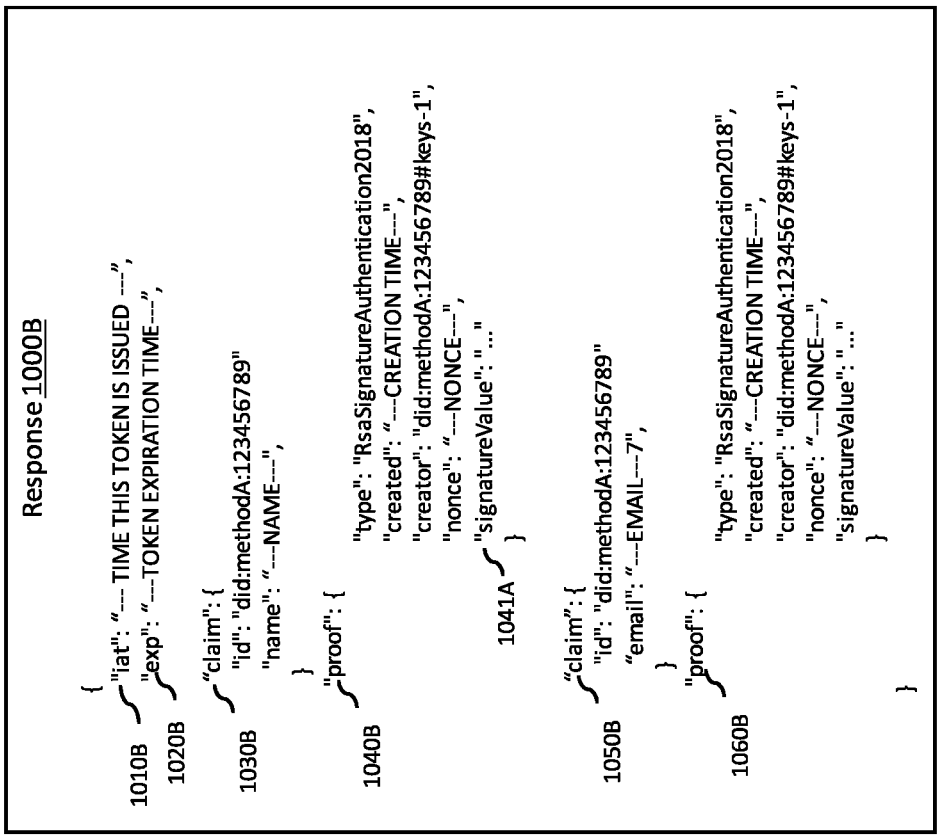
FIG. 10B illustrates an example response of a subject entity including identification data.
Figure 10A:
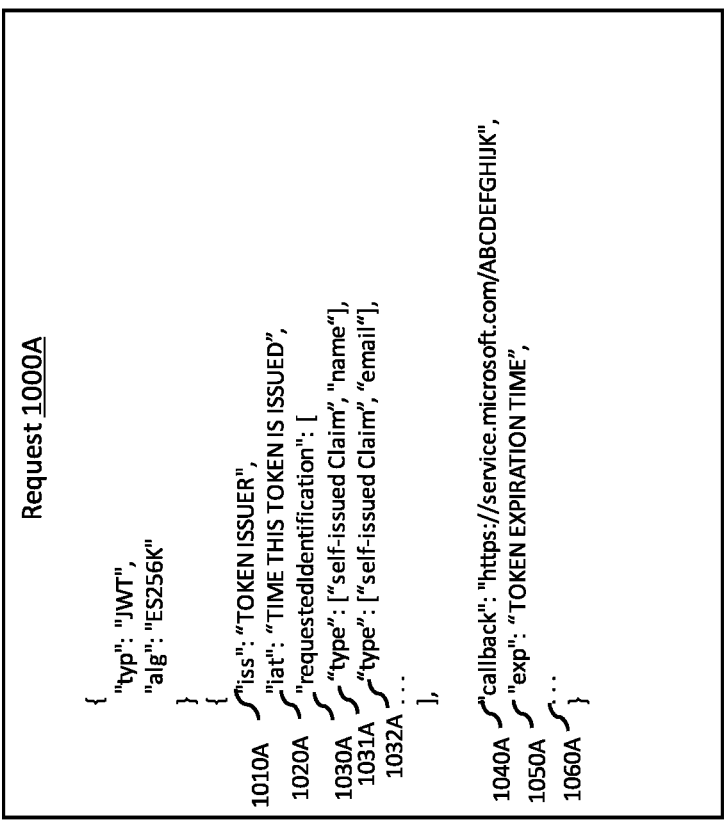
FIG. 10A illustrates an example request of a relying entity for self-identification of a subject entity.

Various data structures may be used to transmit the request for self-identification and/or the identification data. FIG. 10A illustrates an example request 1000A for self-identification, and FIG. 10B illustrates an example response 1000B presenting the identification data. Each of the request 1000A and response 100B is written in JavaScript Object Notation (JSON) web token format, also referred to as JWT. Other structured languages or data structures may also be implemented to achieve the same purposes of requesting self-identification and/or presenting identification data.

Referring to FIG. 10A, the request token 1000A includes data 1010A, and 1020A indicating the token's issuer and the time the token is issued. The request token 1000A also includes data 1030A, indicating requested identification. Here, the requested identification includes a self-issued claim presenting a name of the subject entity 1031A and a self-issued claim presenting an email of the subject entity 1032A.

The request token 1000A also includes a callback address "https://service.microsoft.com/ABCDEFGHIJK" 1040A, which is a URL, indicating where the computing system of the subject entity is required to send its response to. Finally, there is also an expiration time 1050A indicating an expiration time for the request token 1000A, as such, the DID owner must respond to the request token 1000A before the expiration time. The ellipsis 1060A represents that the request token 1000A may also include additional data related to the token issuer, the DID owner, or the identification mechanism(s).

FIG. 10B illustrates an example response token 1000B that presents the identification data including self-issued claims to the relying entity. The response token 1000B also includes data 1010B, indicating the time the token 1000B was issued. The response token 1000B also includes data 1020B, indicating an expiration time of the token 1000B. Further, the response token 1000B also includes a claim 1030B and a corresponding proof 1040A. The claim 1030B presents a name of the subject entity (i.e., the owner of DID 12356789), and the proof 1040B includes a cryptographic signature 1041A signed by a private key of DID 123456789 to prove that the claim 1030B was issued by the owner of the DID 123456789. Similarly, the response token 1000B also includes a claim 1050B and a corresponding proof 1060B. The claim 1050B presents an email address of the subject entity (i.e., the owner of DID 123456789), and the proof 1060B also includes a cryptographic signature signed by a private key of DID 123456789. The response token 1000B is merely an example format for presenting identification data. Various other formats and/or syntax may be implemented. For example, it is not necessary that each claim includes a separate signature. For example, in some embodiments, a single proof may be generated to prove more than one claim. It is also possible that each claim includes more than one property-value pair.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 11:
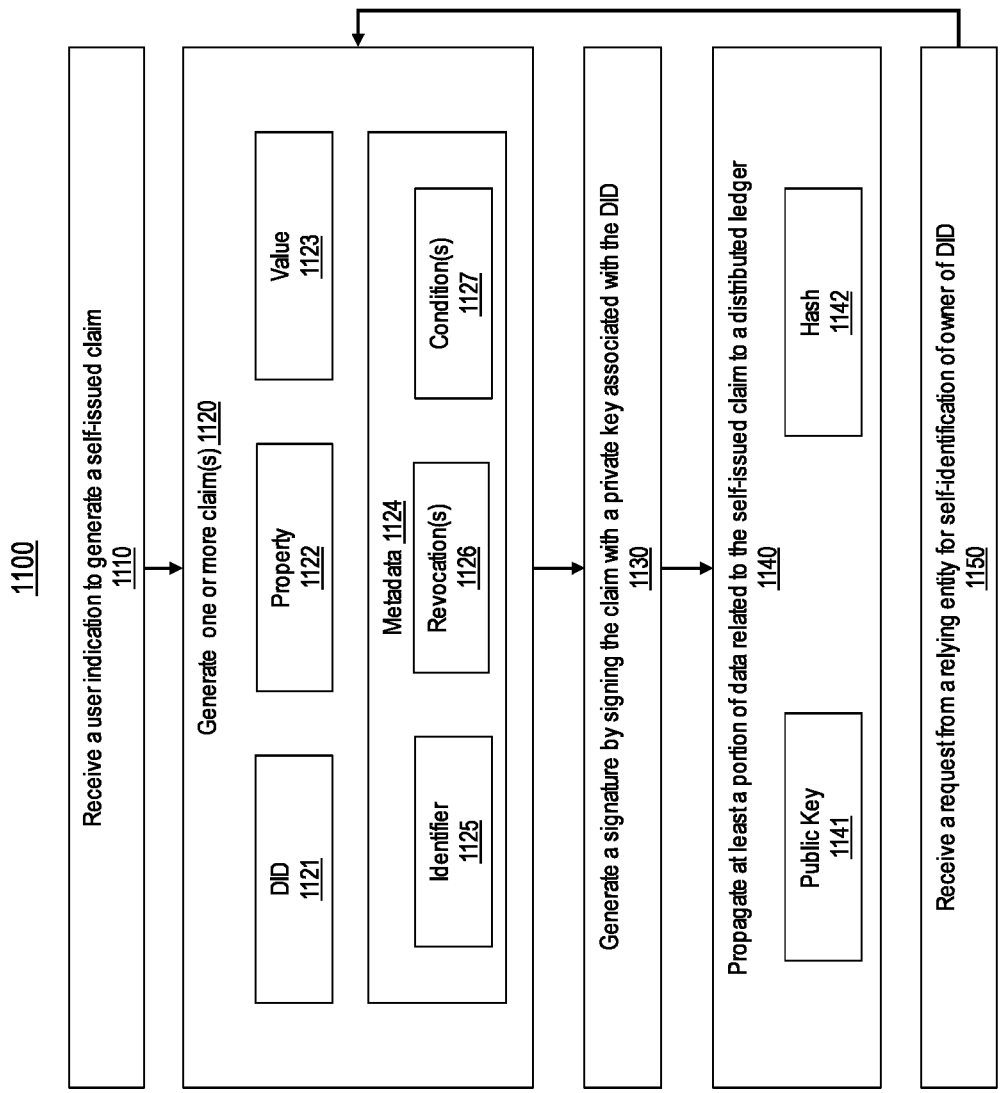
FIG. 11 illustrates a flowchart of an example method for generating one or more self-issued claims.

FIG. 11 illustrates a flowchart of an example method 1100 for generating one or more self-issued claims. The method 1100 is likely implemented in a computing system of a subject entity that is an owner of a DID. The method 1100 includes receiving a user indication to generate a self-issued claim 1110). In response to the user indication, the computing system generates one or more claims 1120). For each of the one or more claims, at least the corresponding DID 1121, a property 1122, a value of the property 1123 are recorded in the claim. In some cases, metadata data 124, such as a unique identifier identifying the claim 1125, one or more conditions for accessing the self-issued claim 1126, and/or one or more revocation mechanisms 1127 are also recorded in at least some of the claims. The generated claim is then signed by a private key associated with the DID (1130). At least a portion of data related to the self-issued claim is then propagated onto a distributed ledger (1140). In some embodiments, the public key of the DID (corresponding to the private key used to sign the claim) is propagated onto the distributed ledger (1141). In some embodiments, a hash of the public key of the DID or a hash of the self-issued claim is propagated onto the distributed ledger (1142).

In some embodiments, the self-issued claims are generated in response to receiving a request from a relying entity for self-identification of the owner of DID (1150). For example, the request indicates the properties (e.g., name, email) that the relying entity requires to be identified. In response to the request, the computing system generates one or more self-issued claims including the required properties and their corresponding values.

Figure 12:
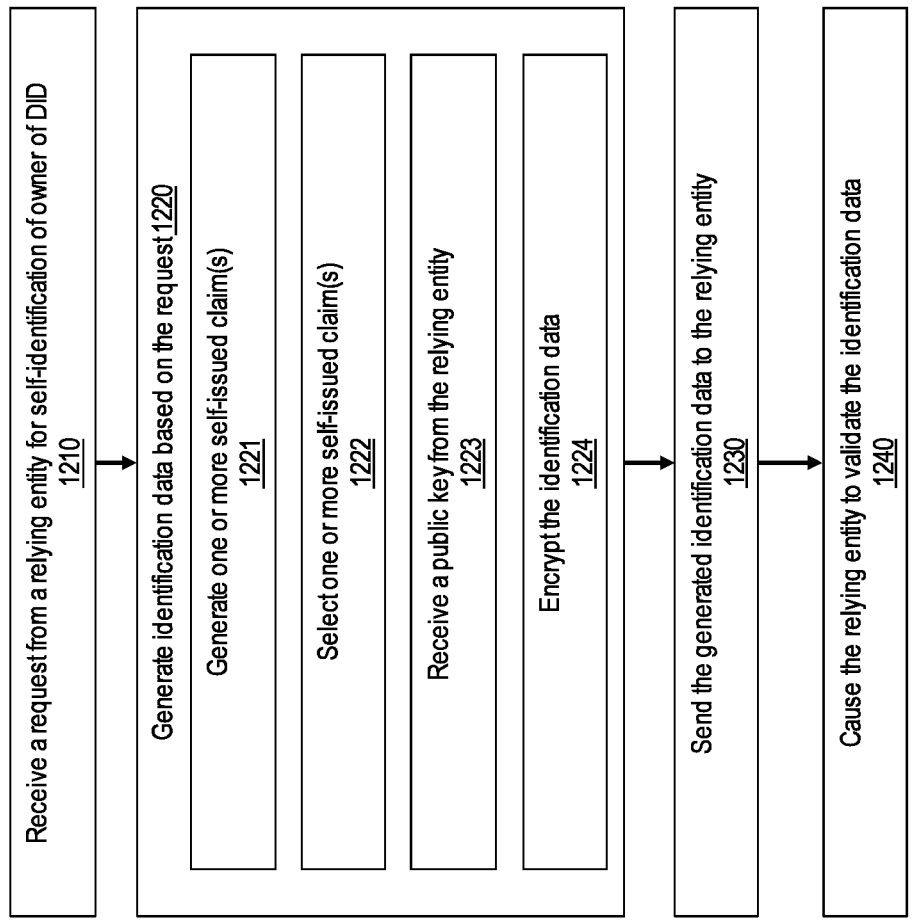
FIG. 12 illustrates a flowchart of an example method for generating and sending identification data including one or more self-issued claims by a computing system of a subject entity.

FIG. 12 further illustrates a flowchart of an example method 1200 for generating identification data based on a request from a relying entity. The method 1200 is also likely to be performed by a computing system associated with a subject entity who is an owner of a DID. The method 1200 includes receiving a request from a relying entity for self-identification of an owner of DID (1210). The computing system then generates identification data based on the request (1220). The generating the identification data includes generating one or more self-issued claims (1221) and/or selecting one or more existing self-issued claims 1222). In some embodiments, the computing system also receives a public key from the relying entity (1223) and uses the public key to encrypt the identification data (1224). The computing system then sends the generated identification data to the relying entity (1230) and causes the relying entity to validate the identification data via data propagated onto the distributed ledger (1240).

FIG. 13 illustrates a flow chart of an example method 1300 for validating identification data received from a subject entity. The method 1300 is likely implemented at a computing system of a relying entity. When the relying entity is also a DID owner, the computing system is likely a management module (e.g., wallet), a user agent, and/or an ID hub associated with the relying entity's DID. The method 1300 includes receiving identification data from a subject entity who is associated with a DID (1310). In some cases, the identification data is encrypted by a public key of the relying entity. In such a case, the computing system decrypts the encrypted identification data by a private key of the relying entity (1320).

The identification data includes at least one self-issued claim. The computing system validates the identification data (1330). The validating the identification data includes extracting at least one self-issued claim from the identification data (1331). The at least one self-issued claim includes a signature signed by a private key of the subject entity. The computing system obtains a public key of the subject DID (1332) and decrypts the signature of each self-issued claim 1333). The computing system also retrieves data related to each claim propagated onto a distributed ledger (1334) and uses the retrieved data to validate the decrypted signature (1335). In some embodiments, the public key of the subject entity is propagated onto the distributed ledger, and the public key is retrieved from the distributed ledger and used to decrypt the signature. In some embodiments, a hash of the public key or a hash of the self-issued claim is propagated onto the distributed ledger. The computing system rehashes the received public key or the self-issued claim, and compare the rehashed data with the data propagated onto the distributed ledger to determine whether the identification data is valid.

In some cases, the self-identification is mutually performed, i.e., each of the entities will present its identification data to the other entity. In such a case, each of the entities is both a subject entity and a relying entity. As such, the claimed embodiments allow entities to securely self-identify themselves with each other, and also allow entities to validate other entity's self-identification data. Further, the self-identification data is only presented to the intended relying entities based on need, such that the users' privacy is not only protected from irrelevant entities but also protected from centralized service providers.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors;
a decentralized identifier(DID) management module;
a DID creation module;
   wherein the DID creation module comprises one or more drivers that are configured to work with a distributed ledger that the DID will be included on: and
a key generation module;
one or more hardware storage devices having thereon computer-executable instructions that are structured such that, when executed by the one or more processors, cause the one or more processors to perform the steps of:
   generating, by the DID creation module, the DID;
   determining, by the DID creation module, that the DID complies with the underlying methods of the distributed ledger;
   generating, by the DID management module, one or more claims, each of which including at least information related to (1) the DID, (2) a property of a subject entity who is an owner of the DID, and (3) a value corresponding to the property;
   for each of the one or more claims;
   generating, by the key generation module, a private key;
   generating, by the key generation module, a public key that is paired with the private key;
   generating, by the DID management module, a cryptographic signature by signing the claim with the private key associated with the corresponding DID;
   proving, by the generated cryptographic signature that the claim is a self-issued claim, which is issued blithe subject entity and is about the subject entity; and
   propagating, by the key generation module, a portion of data related to the self-issued claim including ono of the generated public key or a hash of the generated public key onto a distributed ledger.

2. The computing system of claim 1, further causes the processor to perform the steps of:
   receiving a user indication from the subject entity for generating a self-issued claim, the user indication including specifying at least (1) a DID, (2) a property of the subject entity, and (3) a value corresponding to the property; and
   generating a self-issued claim based on the user indication.

3. The computing system of claim 1, the computing system further caused to record one of the following with at least one of the one or more self-issued claims as metadata: (1) a unique identifier identifying the corresponding self-issued claim, (2) one or more conditions for accessing the corresponding self-issued claim, or (5) one or more revocation mechanisms for revoking the corresponding self-issued claim.

4. The computing system of claim 3, the one or more conditions comprising at least one of the following: (1) requiring a relying entity to pay a predetermined amount of cryptocurrency, (2) requiring a relying entity to provide identification information, (3) requiring a relying entity to provide one or more verifiable claim(s), (4) requiring a relying entity to grant permission for accessing a portion of data, or (5) requiring a relying entity to provide a particular service.

5. The computing system of claim 3, the one or more revocation mechanisms comprising at least one of the following: (1) an expiration time of the corresponding self-issued claim, (2) a predetermined number of times that the corresponding self-issued claim can be accessed by a relying entity, (3) an automatic revocation mechanism that automatically revokes the corresponding self-issued claim in response to a change of data contained in a DID document of the corresponding DID or personal data of the owner of the corresponding DID, or (4) a manual revocation mechanism that allows the owner of the corresponding DID to manually revoke the self-issued claim.

6. The computing system of claim 1, the computing system further causes the processor to perform the steps of:
receiving a request from a relying entity for self-identification of the subject entity; and
in response to the request,
selecting at least one self-issued claim of the subject entity;
generating identification data including the at least one self-issued claim;
sending the generated identification data to the relying entity; and
causing the identification data to be validated by the relying entity via data related to the at least one self-issued claim that is propagated onto the distributed ledger.

7. The computing system of claim 6, wherein:
the request from the relying entity includes a request for a value of a particular property of the subject entity,
in response to the request, the computing system causes the processor to perform the steps of:
accessing personal data of the subject entity or a DID document of the DID to retrieve the value of the particular property of the subject entity;
generating a self-issued claim including the retrieved value of the particular property, and
generating identification data including the self-issued claim.

8. The computing system of claim 6, wherein the validating the identification data comprises validating each of the at least one self-issued claim, the validating each self-issued claim comprising:
extracting at least one self-issued claim from the identification data;
obtaining the public key of the DID;
decrypting the cryptographic signature of the at least one self-issued claim by the public key of the DID;
retrieving data related to the at least one self-issued claim from the distributed ledger; and
determining whether a result of the decryption is valid based on the portion of data related to the self-issued claim.

9. The computing system of claim 6, the computing system further causes the processor to perform the steps of:
receiving a public key of the relying entity;
encrypting the identification data by the public key of the relying entity; and
sending the encrypted identification data to the relying entity.

10. The computing system of claim 6, the computing system further causes the processor to perform the steps of:
mapping a plurality of self-issued claims to a plurality of relying entities;
recording the mapping between the plurality of self-issued claims and the plurality of relying entities as mapping data; and
in response to receiving a request from a particular relying entity for self-identification,
accessing the mapping data to retrieve one or more self-issued claims that are mapped to the particular relying entity; and
generating identification data including the one or more self-issued claims.

11. The computing system of claim 10, the computing system further causes the processor to perform the steps of:
receiving a user input from the subject entity to generate or update the mapping data, the user input indicating mapping one or more particular self-issued claims to one or more particular relying entities;
updating the mapping data based on the user input.

12. The computing system of claim 6, in response to receiving a request from a relying entity for self-identification, the computing system further causes the processor to perform the steps of:
determining whether metadata associated with the at least one claim includes one or more conditions and whether the one or more conditions are satisfied;
in response to a determination that the one or more conditions are satisfied, generating the identification data; and
in response to a determination that the one or more conditions are not satisfied, denying the request from the relying entity and generate a notification notifying the subject entity.

13. The computing system of claim 6, the computing system further causes the processor to perform the step of:
in response to a change of a value of a property that is associated with a self-issued claim, revoking a self-issued claim that includes the value of the property or update the self-issued claim with the changed value of the property.

14. A method for a computing system to issue and present self-issued claims in a decentralized environment the computing system comprising a decentralized identifier (DID) management module, a DID creation module, wherein the DID creation module comprises one or more drivers that are configured to work with a distributed ledger that the DID will be included on, and a key generation module, the method comprising:
generating, by the DID creation module, the DID;
determining, blithe DID creation module, that the DID corn plies with the underlying methods of the distributed ledger;
generating, by the DID management module, one or more claims, each of which including at least information related to (1) the DID, (2) a property of a subject entity who is an owner of the DID, and (3) a value corresponding to the property;
generating, by the key generation module, a private key;
generating, by the key generation module, a public key that is paired with the private key;
generating, by the DID management module, a cryptographic signature by signing the claim with the private key associated with the corresponding DID;
proving, by the generated cryptographic signature, that the claim is a self-issued claim, which is issued by the subject entity and is about the subject entity; and
propagating, by the key generation module, a portion of data related to the self-issued claim including one of the generated public key or a hash of the generated public key onto a distributed ledger.

* * * * *